United States Patent
Borazjani et al.

[19]

[11] Patent Number: 5,825,829
[45] Date of Patent: Oct. 20, 1998

[54] MODULATOR FOR A BROADBAND COMMUNICATIONS SYSTEM

[75] Inventors: Ramin Borazjani; Kevin Lee Miller, both of Lawrenceville, Ga.

[73] Assignee: Scientific-Atlanta, Inc., Norcross, Ga.

[21] Appl. No.: 497,458

[22] Filed: Jun. 30, 1995

[51] Int. Cl.$^6$ .............................. H04L 27/20; H04J 1/00; H04H 1/08
[52] U.S. Cl. ......................... 375/308; 375/222; 332/103; 332/145; 370/486; 370/522
[58] Field of Search ................................ 375/302, 271, 375/279, 280, 281, 308, 261, 283, 257; 332/103, 104, 144, 145; 455/42, 100, 3.1, 5.1, 6.1, 6.3; 364/724.1; 348/10; 370/486, 487, 485, 524, 522

[56] References Cited

U.S. PATENT DOCUMENTS

| | | | |
|---|---|---|---|
| 3,497,625 | 2/1970 | Hileman et al. | 179/15 |
| 3,617,941 | 11/1971 | DeLellis | 332/103 |
| 4,015,222 | 3/1977 | Werner | 332/103 |
| 4,077,021 | 2/1978 | Csajka et al. | 332/103 |
| 4,307,464 | 12/1981 | Hughes | 332/103 |
| 4,358,853 | 11/1982 | Qureshi | 375/296 |
| 4,571,549 | 2/1986 | Lods et al. | 332/103 |
| 4,613,976 | 9/1986 | Sewerinson et al. | 375/279 |
| 4,816,783 | 3/1989 | Leitch | 332/103 |
| 4,825,448 | 4/1989 | Critchlow et al. | 375/222 |
| 5,091,705 | 2/1992 | Hiramatsu et al. | 332/103 |
| 5,140,613 | 8/1992 | Birgenheier et al. | 375/308 |
| 5,237,292 | 8/1993 | Chethik | 332/103 |
| 5,381,459 | 1/1995 | Lappington | 379/56 |
| 5,412,352 | 5/1995 | Graham | 332/103 |
| 5,499,241 | 3/1996 | Thompson et al. | 370/486 |
| 5,594,726 | 1/1997 | Thompson et al. | 370/485 |

FOREIGN PATENT DOCUMENTS

| | | |
|---|---|---|
| 0 613 264 A2 | 8/1994 | WIPO . |
| WO 95/08228 | 3/1995 | WIPO . |

OTHER PUBLICATIONS

"A Digitized Group Modulator using Simple Fractional Sampling", Y. Yamada and T. Shirato, Proceedings of 1994 IEEE Globecom, Communications: The Global Bridge, pp. 420–424, Nov. 28–Dec. 2, 1994.

*Primary Examiner*—Chi H. Pham
*Assistant Examiner*—William Luther
*Attorney, Agent, or Firm*—Kenneth M. Massaroni; Hubert J. Barnhardt, III; Kelly A. Gardner

[57] ABSTRACT

A multi-channel modulator for the transmission of telephony signals within a broadband communication system. An interpolation module generates processed I and Q signal components by upsampling filtered I and Q signal components. In turn, these processed I and Q signal components output by a filter are passed to a set of channel modulators. Each channel modulator accepts a pair of processed I and Q signal components and, in response, modulates a selected carrier signal with one of the telephony signals to produce a complex modulated signal. An adder module responds to the complex modulated signals by summing the real signal components to produce a real resultant signal, and to sum the imaginary components to produce an imaginary resultant signal. A digital-to-analog converter (DAC) module coverts the real resultant signal and the imaginary resultant signal, which are represented by digital data streams, to analog signals. A transmitter, responsive to the analog signals, transmits the modulated signals within a frequency band of the broadband communications network.

39 Claims, 9 Drawing Sheets

SPECTRAL ALLOCATION - ALTERNATIVE EMBODIMENT

INPUT TELEPHONY-TO-CATV NETWORK INTERFACE

OUTPUT TELEPHONY-TO-CATV NETWORK INTERFACE

TELEPHONY TERMINAL OR CUSTOMER INTERFACE UNIT

MODULATOR FOR A BROADBAND COMMUNICATIONS SYSTEM

CROSS REFERENCE TO RELATED APPLICATIONS

This application is a related to the U.S. patent application Ser. No. 08/475,220 filed Jun. 7, 1995, issued as U.S. Pat. No. 5,581,555 on Dec. 3, 1996, entitled "Reverse Path Allocation and Contention Resolution Scheme for a Broadband Communications System", which is a continuation-in-part of application Ser. No. 08/219,848, filed Mar. 30, 1994, issued as U.S. Pat. No. 5,594,726 on Jan. 14, 1997, entitled "Frequency Agile Broadband Communications System", which is a continuation-in-part of application Ser. No. 08/123,363, filed Sep. 17, 1993, issued as U.S. Pat. No. 5,499,241 on Mar. 12, 1996, entitled "Broadband Communications System".

FIELD OF THE INVENTION

The system pertains generally to a modulator for broadband communications systems, such as cable or community antenna television (CATV) networks, and is more particularly directed to a multiple-channel modulator for supporting the communication of telephony signals, and other or similar signals, over CATV and equivalent networks.

BACKGROUND OF THE INVENTION

A broadband communications system can communicate telephony signals between subscribers of a telephony network and subscribers of a cable or community antenna (CATV) network. Telephony signals are communicated from the telephony network to the CATV subscribers in a forward band of the cable network. Telephony signals are communicated from the CATV subscribers to the telephony network in a reverse band of the cable network.

A telephony terminal, also called a "customer interface unit" or "CIU", is typically located proximate to one or more of the CATV subscribers to convert the incoming digital telephony signals in the forward band into analog signals for processing by a conventional telephone handset. The CIU also can convert outgoing analog telephone signals from the telephone handset into Quadrature Phase Shift Keying (QPSK)-modulated signals for transmission in the reverse band.

The CIU operates to modulate a selected radio frequency (RF) carrier signal with telephony information to support the transmission of an outgoing telephone signal. The CIU can support frequency agile operations by selecting the RF carrier frequency in response to channel information supplied by a data link or a directory channel via the forward band. This permits the selective allocation of bandwidth within the reverse band to satisfy the telephony service demands of subscribers and to avoid particular reverse band channels that are susceptible to noise interference.

A conventional CIU includes one or more modulators, also described as reverse band modulators, to modulate a selected RF carrier signal with telephony information, such as a DS0 channel, for transmission of the modulated signal within the reverse band of the cable network. Each modulator can accept a data stream of digitized telephony information and, in response, QPSK-modulate a single RF carrier to transmit the telephony information in an available frequency slot or channel of the reverse band.

The use of a single-channel modulator for placing a single modulated signal within the frequency range of the reverse band is sufficient for servicing the communication needs of a typical residential subscriber, which would otherwise be serviced by a single conventional telephone line. However, the telephony requirements of businesses and consumers residing in multi-dwelling units, such as offices or apartment complexes, within a subscriber area may exceed the transmission capacity of a conventional CIU during peak usage of the broadband communications system. Moreover, the opportunity to manage the frequency spectrum of the reverse band is limited if each modulator of a CIU is limited to the operation of placing a single modulated signal at a particular channel within the reverse band of the cable network.

Therefore, there is a need for a multi-channel modulator that accepts multiple data streams for modulating selected RF carriers to support the transmission of modulated signals within the reverse band of a broadband communications system that is compatible with existing public switched telephone networks. There is also a need for a multi-channel modulator capable of placing independent channels within a particular subband of the reverse band to support the flexible management of the frequency spectrum during high density usage within the subscriber area of the broadband communications system.

The present invention fulfills the needs described hereinabove by accepting digitized data streams of telephony information, such as DS0 signals, and modulating selected RF carriers for the transmission of modulated signals within channels of the reverse band of a cable network. This multi-channel modulator facilitates the flexible management of the frequency spectrum for the broadband communications system by modulating each selected RF carrier on an "independent" basis, thereby allowing the placement of each modulated signal at any frequency slot or channel within the reverse band.

SUMMARY OF THE INVENTION

The present invention satisfies the requirements for an apparatus capable of modulating multiple carrier signals with communications-related information to support broadband communications, including bidirectional telephony communications, over a CATV distribution network. In particular, the present invention provides a multi-channel modulator for use in the operating environment of a combined cable network/telephony system that is compatible with today's public switched telephone networks.

The multi-channel modulator accepts digitized data streams of telephony information and, in response, modulates selected RF carriers for the transmission of telephony signals within the reverse band of the CATV distribution network, also described as a cable network. The multi-channel modulator supports the flexible management of the frequency spectrum allocated for use by the reverse channel of the cable network by modulating each selected RF carrier on an "independent" basis, thereby allowing the placement of each modulated signal at any frequency slot or channel within the reverse band. A channel is considered to be "independent" if the channel can be placed anywhere within the allocated frequency spectrum without regard to the frequency assignment for other channels.

Although it will be appreciated that modulated signals could be placed in an adjacent fashion within the reverse band, this alternative modulation technique would limit the flexibility for possible frequency allocations in a subscriber area during high-density usage of the broadband communication system. For example, given a high concentration of telephony service usage in a subscriber area, it is much more likely that any single channel will be available for use within the reverse band rather than multiple "adjacent" channels. Accordingly, the present invention provides the advantage of facilitating the flexible management of the frequency spectrum of a broadband communications network.

For a representative example of the frequency spectrum for a broadband communications system, each channel or modulated signal within the reverse band has a bandwidth of 49.5 kHz and each subband of the reverse band has a bandwidth of 5.0 MHz. A modulated signal can be allocated to any of approximately 100 frequency slots (specifically 101) or channels of the subband. In other words, for this example, approximately 100 frequency slots are available for assignment by the multi-channel modulator within a 5.0 MHz subband.

The multi-channel modulator is typically used with a customer interface unit (CIU) for connection to a broadband communication network. The CIU operates to receive first signals in a first frequency band, i.e., the forward band or channel of the broadband communication network, from a headend. The CIU also communicates telephony signals between a subscriber and the headend in a second frequency band, i.e., the reverse band of the broadband communication network. A first demodulator is typically used to demodulate first signals in the first frequency band and for coupling demodulated first signals to an output port. The CIU also can include at least one multi-channel modulator for generating modulated signals in the second frequency band by modulating carrier signals in accordance with the telephony signals, each of the telephony signals including in-phase (I) and quadrature (Q) signal components.

Turning now to a detailed review of the multi-channel modulator, a filter accepts the I and Q signal components and filters them to produce filtered I and Q signal components. The filter can be implemented as a Nyquist filter for sharply defining the bandwidth of an input signal and for reducing possible intersymbol interference. An interpolation module can generate processed I and Q signal components by upsampling filtered I and Q signal components. In turn, these processed I and Q signal components are passed to a set of channel modulators, each channel modulator capable of generating a modulated signal within a discrete increment channel of the reverse band.

Each channel modulator accepts a pair of processed I and Q signal components and, in response, modulates a selected carrier signal with one of the telephony signals to produce a complex modulated signal. The complex modulated signal has a real signal component and an imaginary signal component of the form "f(t)=x+jy". The complex modulated signal is produced as a result of cross multiplication and add operations.

An adder module responds to the complex modulated signals by summing the real signal components to produce a real resultant signal. The adder module also operates to sum the imaginary components to produce an imaginary resultant signal. A digital-to-analog converter (DAC) module can covert the real resultant signal and the imaginary resultant signal, which are represented by digital data streams, to analog signals. A transmitter, responsive to the analog signals, can transmit the modulated signals within the second frequency band of the broadband communications network.

The multi-channel modulator can also include a control module for controlling access to the filter. The I and Q signal components of the information signals are queued by the control module, and each of the queued I signal components and the queued Q signal components are serially input, one at a time, to the filter. The control module can include a set of shift registers, one for each of the I signal components and the Q signal components, for storing the I signal components and the Q signal components. A multiplexor, connected to the shift registers, can supply a selected I signal component or a selected Q signal component to the filter in response to an address signal. The address signal corresponds to the selected I signal component or the selected Q signal component. A demultiplexor, connected between the filter and the channel modulators, is useful for supplying the filtered I signal components and the filtered Q signal components to the channel modulators.

Turning now to other aspects of the multi-channel modulator, each channel modulator of the multi-channel modulator includes look-up tables for storing sine (SIN) and cosine (COS) values, a set of multipliers to support cross-multiplication operations, and a pair of adders for summing the resultant signals generated by the cross-multiplication operations. In response to phase values corresponding to a carrier signal frequency, sine and cosine values are read from the look-up tables and supplied to the multipliers. The multipliers also accepts the processed I and Q signal components of "$I_{IN}$" and "$Q_{IN}$", as output by the interpolation module. The set of multipliers output real and imaginary components that are summed by the adders to produce a complex modulated signal. The real component of the complex modulated signal is represented by "$I_{IN}\times$COS (PHASE)+$Q_{IN}\times$SIN (PHASE)" and the imaginary component of the complex modulated signal is represented by "$Q_{IN}\times$COS (PHASE)–$I_{IN}\times$SIN (PHASE)".

The adder module can be implemented by a first adder and a second adder. The first adder is responsive to the complex modulated signal generated by each of the channel modulators for summing the real signal components to produce a real resultant signal. Likewise, the second adder is responsive to the complex modulated signal generated by each of the channel modulators for summing the imaginary components to produce an imaginary resultant signal.

The digital-to-analog converter (DAC) module of the multi-channel modulator can include a first DAC for converting the real resultant signal to a first analog signal and a second DAC for converting the imaginary resultant signal to a second analog signal. The transmitter can include a frequency shifter, responsive to the analog signals and to a frequency shift signal having a selected frequency of the second frequency band, for shifting the first analog signal and the second analog signal by the selected frequency. An adder sums the first and second analog signals to generate the modulated signals of the second frequency band.

In view of the foregoing, it will be understood that an object of the present invention is to provide a multi-channel modulator that accepts multiple data streams of communications information to modulate selected RF carriers, thereby supporting the transmission of modulated signals within the frequency band of a broadband communications system.

A further object of the present invention is to provide a multi-channel modulator that accepts multiple data streams of telephony information to modulate selected RF carriers, thereby supporting the transmission of modulated signals within the reverse band of a cable network of a broadband communications system that is compatible with existing public switched telephone networks.

A further object of the present invention is to provide a multi-channel modulator capable of placing independent channels within a subband of the reverse band to support the flexible management of the frequency spectrum during high density usage within the subscriber area of the broadband communications system.

These and other objects, features and advantages of the invention will be better understood and more fully appreciated if a reading of the following detailed description is undertaken in conjunction with the appended drawings and claims.

DETAILED DESCRIPTION ON THE PREFERRED EMBODIMENT

Figure 1:
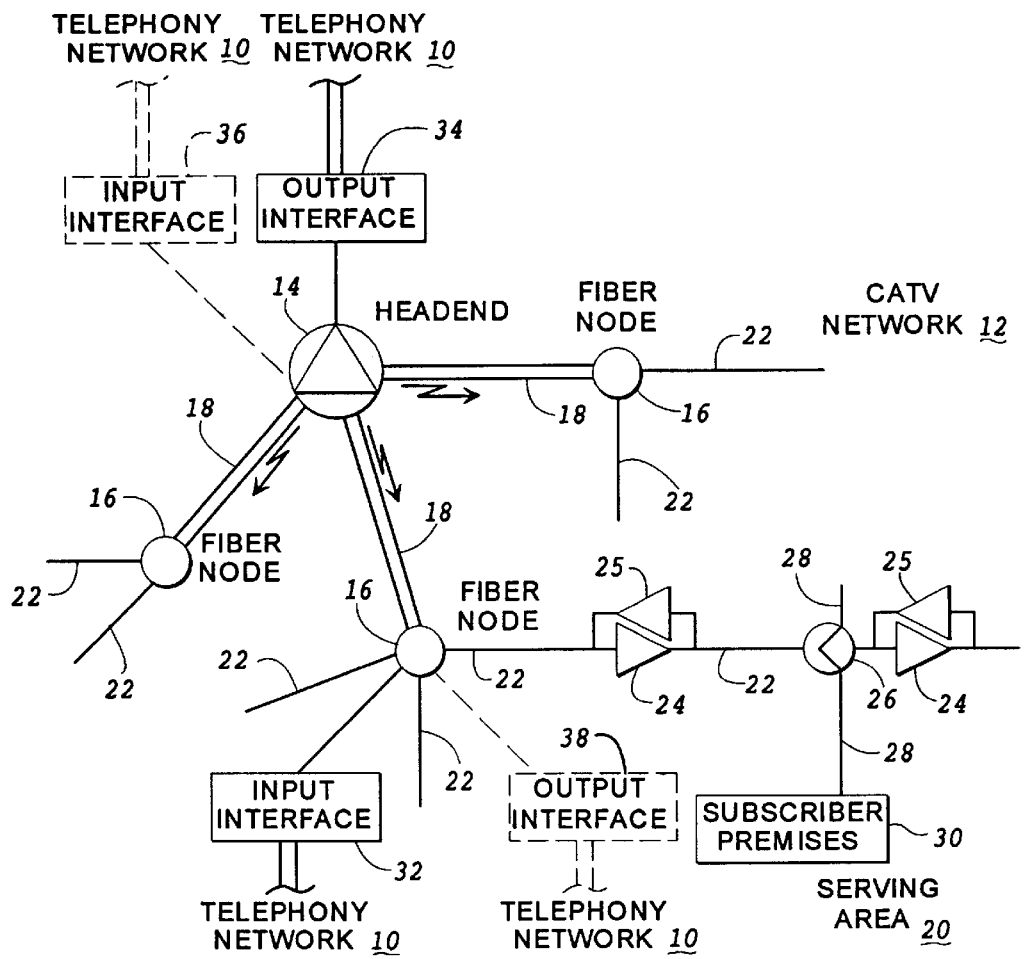
FIG. 1 is a system block diagram of a broadband telephony system constructed in accordance with the invention.

In order to introduce the present invention and the problems that it solves, it is useful to review a conventional CATV broadband communication system, and to then examine an approach taken by the assignee for the present application to introduce telephony signals into the broadband communications environment.

Conventional Cable Television Systems (CATV)

Cable television systems, sometimes referred to as community-antenna television (CATV) systems, are broadband communications networks of coaxial cable and optical fiber that distribute television, audio, and data signals to subscriber homes or businesses. In a typical CATV system, a single advantageously located antenna array feeding a cable network supplies each individual subscriber with a usable television signal.

Cable networks have experienced enormous growth and expansion in the United States, particularly in urban networks. It is estimated that CATV networks currently pass approximately 90% of the population in the United States, with approximately 60–65% of all households actually being connected. While cable systems originally had very simple architectures and provided a limited number of different television signals, the increase in the number of television broadcasters and television owners over the last several decades has resulted in much more complex and costly modern cable distribution systems.

A typical CATV system comprises four main elements: a headend, a trunk system, a distribution system, and subscriber drops.

The "headend" is a signal reception and processing center that collects, organizes and distributes signals. The headend receives satellite-delivered video and audio programming, over-the-air broadcast TV station signals, and network feeds delivered by terrestrial microwave and other communication systems. In addition, headends may inject local broadcasting into the package of signals sent to subscribers such as commercials and live programming created in a studio.

The headend contains signal-processing equipment that controls the output level of the signals, regulates the signal-to-noise ratio, and suppresses undesired out-of-band signals. Typical signal-processing equipment includes a heterodyne processor or a demodulator-modulator pair. The headend then modulates received signals onto separate radio frequency (RF) carriers and combines them for transmission over the cable system.

The "trunk system" is the main artery of the CATV network that carries the signals from the headend to a number of distribution points in the community. A modern trunk system typically comprises of a combination of coaxial cable and optical fibers with trunk amplifiers periodically spaced to compensate for attenuation of the signals along the line. Such modern trunk systems utilizing fiber optics and coaxial cable are often referred to as "fiber/coax" systems.

The "distribution systems" utilize a combination of optical fibers and coaxial cable to deliver signals from the trunk system into individual neighborhoods for distribution to subscribers. In order to compensate for various losses and distortions inherent in the transmission of signals along the cable network, line-extender amplifiers are placed at certain intervals along the length of the cable. Each amplifier is given just enough gain to overcome the attenuation loss of the section of the cable that precedes it. A distribution network is also called the "feeder".

There is a strong desire in the CATV and telecommunications industry to push optical fiber as deeply as possible into communities because optical fiber communications can carry more signals than conventional networks. Due to technological and economic limitations, it has not yet proved feasible to provide fiber to the subscriber's home. Present day "fiber deep" CATV distribution systems including optical fibers and coaxial cable are often called "Fiber-To-the-Serving-Area" or "FTSA" systems.

"Subscriber drops" are taps in the distribution system that feed individual 75 Ω coaxial cable lines into subscribers' television sets or subscriber terminals, often referred to as "subscriber premises equipment" or "customer premises equipment" ("CPE"). Because the tap is the final service point immediately prior to the subscriber premises, channel authorization circuitry is often placed in the tap to control access to scrambled or premium programming.

Cable distribution systems were originally designed to distribute television and radio signals in the "downstream" direction only (i.e., from a central headend location to multiple subscriber locations, also referred to as the "forward" path). Therefore, the component equipment of many older cable systems, which includes amplifiers and compensation networks, is typically adapted to deliver signals in the forward direction only. For downstream transmissions, typical CATV systems provide a series of video channels, each 6 MHz in bandwidth, which are frequency division multiplexed across the forward band, in the 50 MHz to 550 MHz region of the frequency spectrum. As fiber is moved more deeply into the serving areas in fiber/coax and FTSA configurations, the bandwidth of the coax portion is expected to increase to over 1 GHz.

The advent of pay-per-view services and other interactive television applications has fueled the development of bidirectional or "two-way" cable systems that also provide for the transmission of signals from the subscriber locations back to the headend. This is often referred to as the "upstream" direction or the "reverse" path. This technology has allowed cable operators to provide many new interactive subscriber services on the network, such as impulse-pay-per-view (IPPV). In many CATV systems, the band of signals from 5 MHz to 30 MHz is used for reverse path signals.

However, the topology of a typical CATV system, which looks like a "tree and branch" with the headend at the base and branching outwardly to the subscriber's, creates technical difficulties in transmitting signals in the upstream direction back to the headend. In the traditional tree and branch cable network, a common set of downstream signals are distributed to every subscriber home in the network. Upstream signals flowing from a single subscriber toward the headend pass by all the other upstream subscriber homes on the segment of distribution cable that serves the neighborhood.

The standard tree and branch topology has not proven to be well suited for sending signals from each subscriber location back to the headend, as is required for bidirectional communication services. Tree and branch cable distribution systems are the most efficient in terms of cable and distribution usage when signals have to be distributed in only the downstream direction. A cable distribution system is generally a very noisy environment, especially in the reverse path. Interfering signals may originate from a number of common sources, such as airplanes passing overhead or from Citizens Band (CB) radios that operate at a common frequency of 27 MHz, which is within the typical reverse channel bandwidth of CATV networks. Since the reverse direction of a tree and branch configuration appears as an inverted tree, noise is propagated from multiple distribution points to a single point, the headend. Therefore, all of the individual noise contributions collectively add together to produce a very noisy environment and a communications problem at the headend.

Present day FTSA systems facilitate the communication of signals in the reverse direction by dividing the subscriber base of a cable network into manageable serving areas of approximately 400–2500 subscribers. This allows for the reuse of limited reverse band frequency ranges for smaller groups of subscribers. The headend serves as the central hub of a star configuration to which each serving area is coupled by an optical communications path ending in a fiber node. The fiber node is connected to the serving area subscribers over a coaxial cable distribution sub-network of feeders and drops in each serving area. In the FTSA configuration, some of the signals in the forward direction (e.g., television program signals) are identical for each serving area so that the same subscriber service is provided to all subscribers. In the reverse direction, the configuration provides an independent spectrum of frequencies confined to the particular serving area. The FTSA architecture thus provides the advantage of multiplying the bandwidth of the reverse portions of the frequency spectrum times the number of serving areas.

The Desire for Telephony Service

The ever-expanding deployment of fiber optic technology in CATV systems across the country has cable operators looking to provide a whole new range of interactive services on the cable network. One area that is of particular interest is telephony service. Because of recent advances in technology as well as the loosening of regulations, the once distinct lines between the cable television network and the telephone network have blurred considerably. Currently there is a great demand for a broadband communication system that can efficiently provide telephone service over the existing cable distribution network.

Moreover, there is substantial interest expressed by telephone system operating companies in the idea of increased bandwidth for provision of new services to telephone subscribers, such as television; interactive computing, shopping, and entertainment; video conferencing, etc. Present day "copper" based telephony service (so called because of the use of copper wires for telephone lines) is very bandwidth limited—about 3 kHz—and cannot provide for such enhanced services by the telephone companies without massive changes to the telephone networks infrastructure.

Existing communications systems, however, have not proven to be well suited for the transmission of telephony signals on conventional CATV systems. A system for transmitting telephony signals must be configured to allow single point to single point distribution (i.e., from a single subscriber to a single subscriber). However, unlike the telephone companies with their well-established national two-way networks, the cable industry is fragmented into thousands of individual systems that are generally incapable of communicating with one another. The cable network is instead ideally configured for single point to multiple point signal transmission (i.e., from a single headend downstream to multiple subscriber locations).

Moreover, conventional CATV systems do not have the switching capabilities necessary to provide point to point communications. A communications system for the transmission of telephone signals must therefore be compatible with the public switched telephone networks ("PSTN") operated by the telephone operating companies. To be useful in the carriage of telephony signals, a CATV network must be able to seamlessly interface to a telephony network at a point where it is commercially viable to carry telephony signals. It must also provide signals that can pass to other parts of the interconnected telephone systems without extensive modulation or protocol changes to thereby become part of the international telephone system.

A broadband communications system developed by the assignee for the present application addresses these communications issues. For additional background, the reader is referred to the descriptions of the broadband communications systems in the U.S. application filed Jun. 7, 1995, entitled "Reverse Path Allocation and Contention Resolution Scheme for a Broadband Communication System", which is a continuation-in-part of application Ser. No. 08/219,848, filed Mar. 30, 1994, entitled "Frequency Agile Broadband Communications System", which is a continuation-in-part of application Ser. No. 08/123,363, filed Sep. 17, 1993, entitled "Broadband Communications System". These applications are assigned to the Assignee for the present application, and are hereby incorporated by reference into the present application.

The broadband communications system can communicate telephony signals from a telephony network to the CATV subscribers in the forward band of the cable network, and can communicate telephony signals from the CATV subscribers to the telephony network in the reverse band of the cable network. This broadband communications system can digitize individual subscriber telephony signals and create a multiplexed signal that is carried on a frequency division multiplexed (FDM) carrier in the forward band of the cable network. The digital multiplexed signal is quadrature partial response (QPR) modulated on a carrier which is positioned in an otherwise unused portion of the CATV network forward band. The QPR signal is preferably approximately 3 MHz in bandwidth and easily fits in a standard 6 MHz video channel. Alternatively, a pair of the QPR signals can be placed in an otherwise unused channel in the cable line to utilize approximately 6 MHz of bandwidth. By making a system which uses a robust digital signal, the bandwidth of the forward CATV band can be efficiently allocated. The system operator can plan and change these allocations on a flexible basis as new services are made available or old services are taken off line.

The subscriber telephony signals to the telephony network are digitized and individually modulated on a carrier in the reverse band of the CATV system. As an illustrated example, a subscriber DS0 telephony line is QPSK modulated into an approximately 50 kHz bandwidth signal (e.g., 49.5 kHz) and frequency division multiplexed on the reverse band of the CATV network. The individual telephony signals are multiplexed into a standard time-division multiplexed (TDM) telephony signal which can be adapted to couple directly into a SONET port or other standard telephony connection, such as a DS1, DS2, or DS3 format signal, of the telephony network.

Access to the broadband communications system is provided by a residential interface unit, also called a "customer interface unit" (CIU), which is typically installed outside the subscriber's premises. The broadband telephone signals are terminated at the end of the CATV drop cable and pass through the home as a standard two-wire telephone signal. The subscriber's interior telephony network can be disconnected from the telephone company copper network and connected or jumpered directly to the CIU.

By using the reverse band of the CATV network in small increments of about 50 kHz, the flexibility of the reverse signaling band is not compromised. The system operator can still provide interactive TV services, IPPV, and other reverse path signals while providing telephony service.

The number of subscribers served by the telephony service can be increased several fold if the CATV network is a FTSA network. The space (frequency) division multiplexing (FDM) used in the reverse band makes it economical to provide a substantial number subscribers in a serving area with a telephony service. If a serving area contains 500 subscribers, then the bandwidth needed for a dual path system at about 50 kHz per subscriber would be 25 MHz, which fits within the 5–30 MHz reverse band of the most prevalent split band systems.

The reverse band circuitry can support frequency agility, and can be responsive to channel information provided in a data link or directory channel in the forward band from the headend interface unit for tuning to one or more selected carrier frequencies. The customer interface unit can modulate the selected carriers in accordance with the telephony information to place modulated signals in one or more selected channels. The frequency agile feature permits the selective allocation of bandwidth to satisfy subscriber demands and change of reverse band channels in response to noise in a channel. The frequency agility permits the invention to carry out dynamic bandwidth allocation to effect varying levels of service for subscribers, e.g. single voice line, multiple voice line, ISDN, data communications, etc., and avoid particular reverse band channels that are susceptible to and/or are experiencing noise.

The broadband communications system also can be operative to determine an appropriate service level to provide communications to a particular subscriber, and allocate one or more selected frequency sub bands in the reverse band of the subscription network so as to provide selectably variable bandwidth commensurate with the determined appropriate service level. The identity of the one or more selected frequency sub bands are communicated to the particular subscriber in a data link or directory channel in a forward band. Incoming telephony signals are communicated to the particular subscriber in the forward band of frequencies. At the subscriber terminal associated with the particular subscriber, the identity of the one or more selected frequency sub bands for communications back to the headend is received by monitoring the data link or directory channel. Subscriber telephony signals are then communicated to the headend in the one or more selected frequency reverse sub bands.

Turning now to the drawings, in which like reference numbers represent like elements throughout the various figures, FIG.1 illustrates a broadband communications system is illustrated to define the preferred operating environment of the present invention. The system will be described in connection with the communications of telephony signals, but it will be evident that other signals of similar or equivalent types can also be used. Further, while digital telephony signals are described, the system is also capable of communicating analog telephony signals or other types of digital signals. Referring now to FIG. 1, telephony signals from the telephony network are coupled to the CATV network 12 and are communicated over the CATV network to an addressed subscriber premises 30. The addressed subscriber 30 communicates telephony signals back over the CATV network 12 which are then coupled to the telephony network 10. The system serves as an extension of the telephony network 10 where subscribers can call out to the telephony network 10 or receive calls from the telephony network. This service is in addition to the conventional video, audio, data and other services provided to each subscriber by the CATV network 12.

The use of the term "headend" herein is not limited to a coaxial headend for a conventional CATV system, such as a CATV headend 14. Instead, a headend also can encompass an optical fiber node, such as a node 16 or other communication nodes, which can serve the functions of receiving multiplexed communication signals from a source of signals, such as a telephony central office, and communicating such signals to subscribers in the broadband network. As will be seen in the following discussion, the CATV headend 14 is the preferred embodiment for effecting these functions.

The system includes the telephony network 10 which interfaces through an input interface 32 to the CATV network 12. The CATV network 12 further interfaces with the telephony network 10 through an output interface 34. Telephony signals are communicated to subscribers of the CATV network 12 through the input interface 32 to a subscriber premises 30. Telephony signals from the subscriber premises 30 of the CATV network 12 are communicated over the CATV network 12 and through the output interface 34 to the telephony network 10. The broadband communications system does no switching and thus takes advantage of the strength of the CATV network 12 for its broadband communications path and the strength of the telephony network 10 for its connection and switching capability.

The CATV network 12 is illustrated as having a fiber to the serving area (FTSA) architecture. A headend 14 provides CATV programming which is distributed via a distribution network to a plurality of subscribers at their subscriber premises 30. The distribution network serves a plurality of "serving areas", such as the one referenced at 20, which are groups of subscribers that are located proximate to one another. Each serving area is comprised of groups ranging in size from about 50 homes to about 2500 homes. The headend 14 is coupled to each serving area in a star configuration through an optical fiber 18 which ends in a fiber node 16. The CATV programming and telephony signals are converted from an RF broadband signal to light modulation at the headend 14, transmitted over the optical fiber 18, and then converted back to an RF broadband signal at the fiber node 16. Radiating from each of the fiber nodes 16 throughout its serving area 20 is a coaxial sub-network of feeders 22 having bidirectional amplifiers 24 and bidirectional line extenders 25 for boosting the signal.

The RF broadband signal is distributed to each of the subscriber premises 30 by tapping a portion of the signal from the nearest feeder 22 with a tap 26, which is then connected to the subscriber premises through a standard coaxial cable drop 28. The CATV network thus provides a broadband communications path from the headend 14 to each of the subscriber premises 30, which can number in the several hundreds of thousands.

While one embodiment of the broadband communications system shows the input interface 32 coupled to the fiber node 16 and the output interface 34 coupled to the headend 14, it is evident that the insertion and extraction of the RF telephony signals need not be limited to this single architecture. Both the input interface 32 and an output interface 38 (shown in phantom) can be connected at the fiber node 16. Alternatively, both an input interface 36 (shown in phantom) and the output interface 34 can be coupled to the headend 14. Moreover, the input interface 36 can be coupled to the headend 14, while the output interface 38 can be coupled to the fiber node 16. For cable architectures which do not conform to a star configuration, it is generally most advantageous to insert the RF telephony signals at the headend and to extract them from the system at the headend. Each architecture has its own distinct advantages as will be more fully described hereinafter.

The input and output interfaces 32 and 34 produce a facile method for inserting the telephony signals in one direction and extracting the telephony signals in the other. The telephony signals are transformed into compatible RF signals which can be inserted or extracted from the CATV network 12 in much the same manner as other programming at various points in the network. The compatibility of RF telephony signals with the previous RF signals on the CATV network 12 allows their transmission in a transparent manner over the network without interference to the other signals or special provision for their carriage.

Theoretically, the broadband communications path provided by the CATV network 12 is bidirectional so that information can be passed in each direction. However, because of convention and the single point to multipoint nature of most networks, the reverse path, i.e., communications originating from the subscriber premises 30 and communicated to the headend 14, is much more limited. Normally, the reverse amplifiers 25 are bandwidth limited and include duplexers which separate the CATV spectrum into forward and reverse paths based on frequency.

Figure 2:
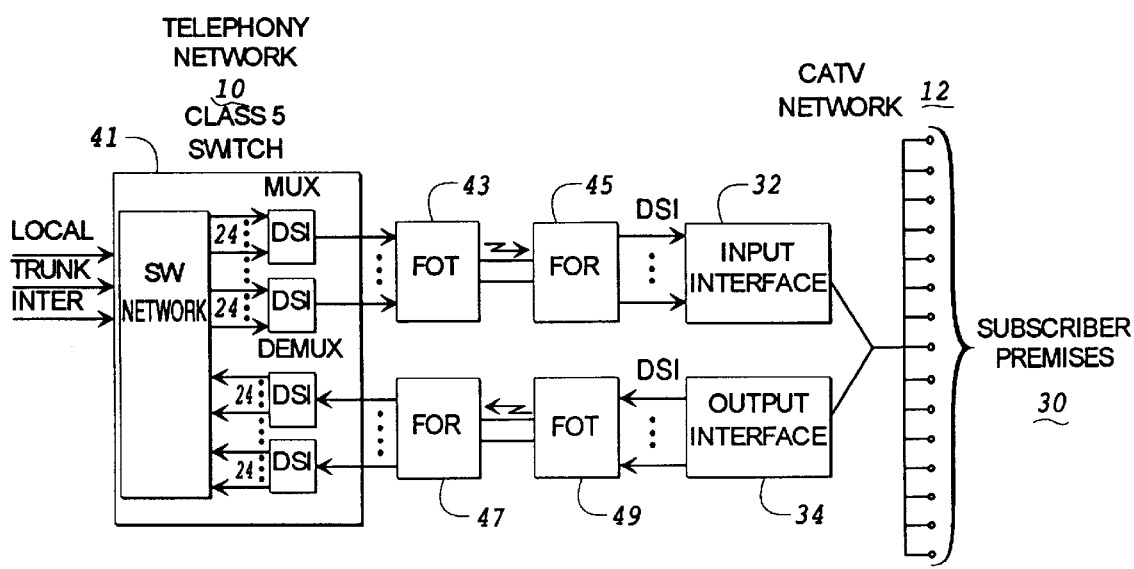
FIG. 2 is a system block diagram of one embodiment of the broadband communications system illustrated in FIG. 1 connected to a telephony network.

FIG. 2 illustrates a preferred implementation of the broadband communication system configured as an extension to a telephony network. For connection to the telephony network 10, a class 5 switch 41 is used. The switch 41 has suitable circuitry for handling conventional local, trunk and interconnect signals which integrate the switch into the local area, national and international calling grids. The switch 41 has a switching network of crosspoints which may switch any of a plurality of inputs to any plurality of outputs. Particularly, the switch 41 has equipment to provide DS1 format interfaces.

As known to those skilled in the art, a "DS0" signal is a standard telephony format corresponding to a 64 kb/s digital channel which can be used for voice, data, audio, etc. Thus a single DS0 telephony signal can be viewed as a single telephone conversation. Likewise, a "DS1" signal corresponds to a 1.544 Mb/s digital channel that contains 24 DS0 channels. For a summary of the bit rates of the standard digital telephony formats and their relationships to one another, see TABLE 1 below:

TABLE 1

| Digital Signal | Bit Rate | DS0 | DS1 | DS3 |
| --- | --- | --- | --- | --- |
| DS0 | 64 kb/s | 1 | 1/24 | 1/672 |
| DS1 (also T-1) | 1.544 Mb/s | 24 | 1 | 1/28 |
| DS1C | 3.152 Mb/s | 48 | 2 | 1/14 |
| DS2 | 6.312 Mb/s | 96 | 4 | 1/7 |
| DS3 | 44.736 Mb/s | 672 | 28 | 1 |
| OC-1 | 51.84 Mb/s | 672 | 28 | 1 |

Additionally, the switch 41 has means for demultiplexing DS1 signals into a plurality of DS0 signals which then can be routed to outgoing points. The system uses a forward path which receives a plurality of the DS1 channels at the input interface 32 and connects them over the CATV network 12 to the subscriber premises 30. The subscriber premises 30 transmits telephony signals over the CATV network 12 to the output interface 34 which converts them back into the same number of DS1 signal channels for transmission to the switch 41. If the switch 41 is located proximate to the input interface 32 and the output interface 34, then they can be coupled directly. Alternatively, as will be the most prevalent case, where a headend or fiber node is not located proximate to the class 5 switch, an optical fiber link can be used to connect the switch 41 and interfaces 32 and 34.

In the forward direction, a fiber optic transmitter 43 converts the plurality of DS1 telephony signals into an optical signal which is transmitted to a fiber optic receiver 45. The fiber optic receiver 45 converts the optical signal back into the DS1 format telephony signals. Likewise, the fiber optic transmitter 49 in the reverse path converts the outgoing DS1 telephony signals into an optical signal which is received by the fiber optic receiver 47 for conversion back into the DS1 telephony format signals.

The DS1 telephony signal format was chosen because it is a standard telephony format, and conventional optical links to do the conversion and transmission are readily available for the transmitters 43, 49 and for the optical receivers 45, 47.

The system uses this bidirectional mode of communication where each DS1 signal contains 24 DS0 channels, which can be considered groups of 64 kb/s digital data channels. The 64 kb/s channels can either be used for voice, data, audio (music, stored information), etc. In general, for telephony type signals, each DS0 channel derived from a connected DS1 link is addressed to and associated with a particular subscriber. Transport for each DS0 signal in the connected DS1 link is provided to the particular subscriber by transmitting incoming telephony signals downstream in a selected DS0 downstream channel in the broadband system forward path. A corresponding DS0 upstream channel is assigned to that subscriber in the broadband system reverse path for outgoing telephony signals. Received DS0 signals from subscribers are then routed to the corresponding DS0 time slot in the DS1 link for outgoing signals. This permits the switch 41 to connect any of the local, trunk or interconnect calling points to any of the DS0 channels in the forward path and its associated DS0 channel in the reverse path to the same local, trunk or interconnect points for completing the communications path. Each of the subscribers 30 appears as another DS0 subscriber connected directly to the class 5 switch 41. The distribution system of the CATV network 12 is transparent to the switch 41 and does not need any further communication, information or connection to the broadband communication system.

In view of the foregoing, it will be understood that there are two types of telephony calls in the broadband communications system. One type of call is an incoming call, whereas the other is an outgoing call. With combinations of these types of calls, all the necessary connections to or from another telephony set and to or from a CATV network subscriber can be made. The subscriber may call (or be called by) another subscriber within the CATV network system, may call (or be called by) a local telephone set within the local area of the telephone network, or may call (or be called by) the telephone network to interface to the long distance and international telephony systems.

An incoming call is directed to a particular subscriber of the CATV network by the telephony network recognizing that the call is directed to one of the group of subscribers belonging to the CATV network. The call is then switched by the telephony network to the OC-1 or other standard telephony signal coupled to the CATV network in the time slot assigned to that subscriber. The addressing and control system of the CATV network then decodes the multiplexed information and translates it into a frequency and time position in the forward multiplex that has been assigned to the particular subscriber. The addressing and control system further provides the necessary control for causing the subscriber equipment to ring or alert the subscriber of an incoming call.

The telephony network and CATV network maintain the connection until there is an indication of an "on hook" signal by one of the parties or another signal that indicates that the communication is complete, such as an end of message data pattern or the like. What is meant by maintaining the connection is that the telephony network continues to place the called party's data packets into the assigned DS0 position in the standard telephony signal and the broadband communications system continues to convert them to the location and frequency in the forward multiplex that is directed to the particular subscriber.

For outgoing calls, the telephony network recognizes from the DS0 position in the standard telephony signal which data packet belongs to a particular originating subscriber of the CATV network. This is an assigned position and the CATV system converts data on whatever carrier frequency is input to the demodulators to that assigned position in the reverse multiplex. Therefore, for outgoing calls the telephony network will consider the standard telephony signal as a group of individual DS0 signals, whose location in the reverse multiplex identifies the originating subscriber.

Figure 3A:
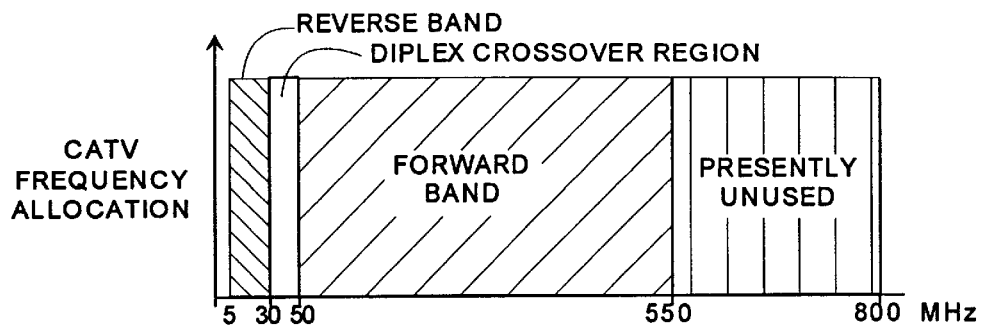
FIG. 3A is a pictorial representation of the frequency allocation of typical split CATV systems illustrating forward and reverse signaling bands.

FIG. 3A illustrates a typical frequency allocation for many of the installed split band CATV networks. The frequencies used for programming which generate the revenues for the system operator are carried in the forward band from 50 MHz to about 550 MHz. Although, the frequencies above 550 MHz are not presently used, there has been increased interest in providing additional services in this unused forward bandwidth, currently considered to extend to about 1 GHz. Conventionally, the forward band comprises a series of video channels, each 6 MHz in bandwidth, which are frequency division multiplexed across the forward band. Several areas are not used and each video channel has a 1.5 MHz guard band between other adjacent channels.

In combination with the forward band, the typical CATV spectrum includes a reverse band from about 5–30 MHz. These frequencies have been allocated for signals returning from the subscriber to the headend. This band has traditionally been relatively narrow because of the high noise from the funneling effects of the multiplicity of the multipoint signals adding to a single point. Further, in the past bandwidth taken from the forward band has meant less revenues from other services. The broadband communications system described herein provides a solution to these problems by providing a system where the telephony signals to a subscriber premises are communicated in the forward band of the spectrum and the telephony signals from a subscriber premises are communicated in the reverse band of the CATV system.

Figure 3B:
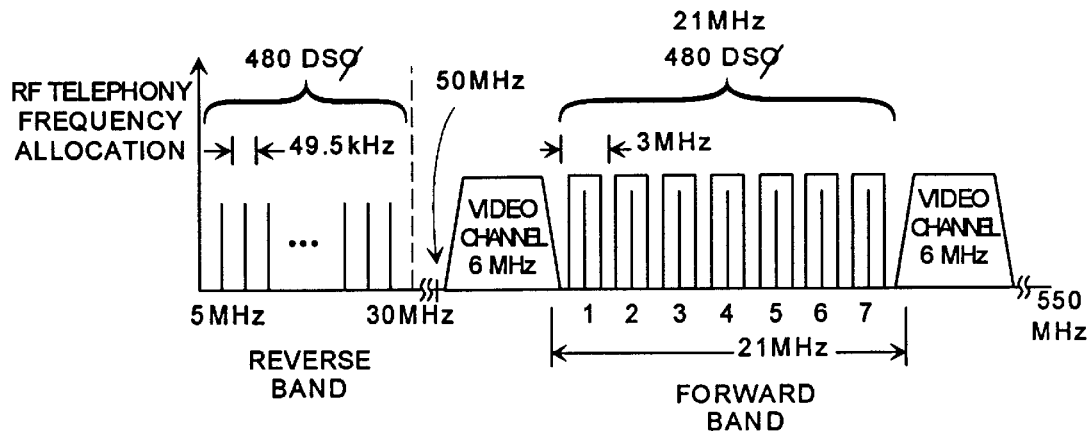
FIG. 3B is a pictorial representation of the frequency allocation of the broadband communications system illustrated in FIG. 2.

As seen in FIG. 3B, the broadband communications system utilizes a plurality of frequency division multiplexed carriers in the forward band to communicate the telephony signals to the subscribers. In the illustrated embodiment, seven (7) channels of approximately 3 MHz are used to carry incoming telephony signals from the telephony network 10. Each forward channel is a QPR modulated carrier, where the modulation occurs as a 6.312 Mb/s digital data stream in three DS1 telephony signals including 72 DS0 telephony signals. The carriage capacity of such a system is then at least 20 DS1 channels, or enough for at least 480 DS0 voice channels.

Each of the reverse band signals are about 50 kHz in bandwidth, preferably 49.5 kHz, which is narrow enough to be easily placed at different frequency division multiplexed positions in the frequency spectrum. The modulators are frequency agile and can reallocate frequencies based upon traffic over the system, noise, channel condition, and time of use. The 49.5 kHz wide carriers can be placed anywhere in the reverse band that there is space for them. Depending upon the CATV system, i.e., whether there is a reverse amplification path in the distribution network, they could also be allocated to frequencies normally reserved for forward band transmissions. Further, such system is expandable by bandwidth for other uses besides the individual telephony signals. For example, if a particular subscriber required a return path of a greater bandwidth than 49.5 kHz, then the bandwidth could be easily allocated to this use without a complete reconfiguration of the system. Such uses may include high speed data transmissions, trunk connections for small central offices, video services originating from the telephony network, and other uses requiring a nonstandard bandwidth.

Figure 3C:
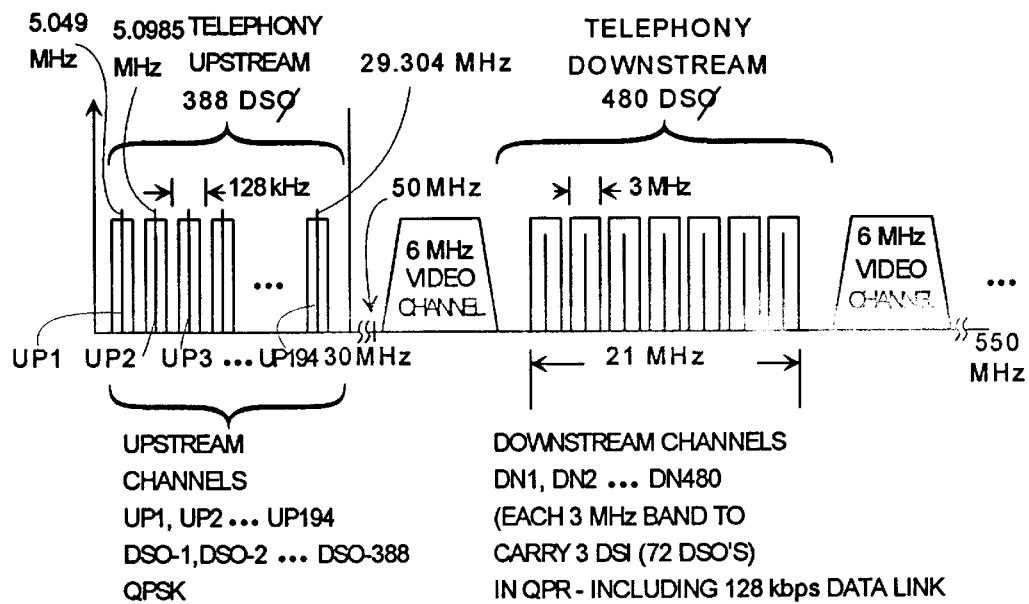
FIG. 3C is a pictorial representation of an alternative frequency allocation for the broadband communications system illustrated in FIG. 2.

FIG. 3C illustrates an alternative frequency allocation for a split-band CATV network. The frequencies used for the television programming that generates revenues for the system operator are allocated to the forward band from about 50 MHz and above. The frequency spectrum in FIG. 3C includes the reverse band from about 5 MHz to about 30 MHz. The 5–30 MHz band is used for upstream telephony signals in the form of 388 DS0's, combined to form DS0 pairs and QPSK modulated in 128 kHz upstream channels or sub bands designated UP1, UP2, . . . UP194, where each upstream channel UPn carries 2 DS0's. Thus, in order to accommodate 388 DS0's, 194 QPSK carriers or channels are required. Each of the upstream channels UPn consumes 128 kHz bandwidth, comprising 108 kHz of modulated signal space and 20 kHz of guard band. The downstream telephony is provided in downstream channels DN1, DN2. . . DN480, each DN corresponding to a DS0. A total of 21 MHz of bandwidth can be provided in 3.168 MHz sub bands, each 3.168 MHz subband carrying the equivalent of three DS1 telephony signals (72 DS0's), in QPR modulation.

Figure 4:
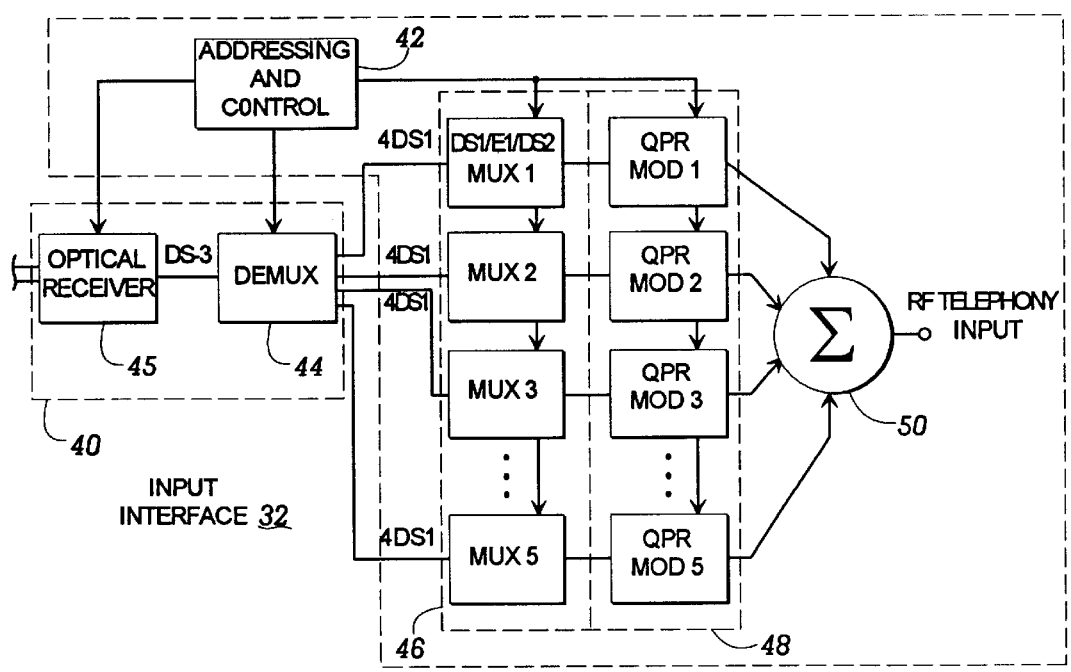
FIG. 4 is a detailed block diagram of the telephony network to the CATV network input interface of the broadband communications system illustrated in FIG. 2.

A detailed block diagram of the input interface 32 is illustrated in FIG. 4. The function of the input interface 32 is to convert the 20 DS1 telephony signals into the seven QPR modulated RF signals which are sent to the subscribers in the forward band of the CATV system 12. The input interface 32 is connected to an optical interface 40, comprising a fiber optic receiver 45 and a demultiplexor 44. The fiber optic receiver 45 operates to convert the optical signal into an RF digital signal of a standard telephony format. The demultiplexor 44 receives the digital DS3 telephony signal and separates it into its 28 component DS1 signals, where each DS1 signal comprises 24 DS0 signals. The optical interface 40 also allows an addressing and control unit 42 to decode and strip overhead and framing bits from the signal.

The input interface 32 comprises a series of five multiplexers 46, which each take four of the DS1 signals from the demultiplexor 44 and combine them with signaling and addressing bits from the addressing and control unit 42 to form a 6.312 Mb/sec serial digital signal. Each of the five digital signals is modulated on a selected carrier frequency by an associated QPR modulator 48. The five telephony channels from the outputs of the modulators 48 are frequency division multiplexed together in an RF combiner 50 before being inserted conventionally on the CATV network 12.

Figure 5:
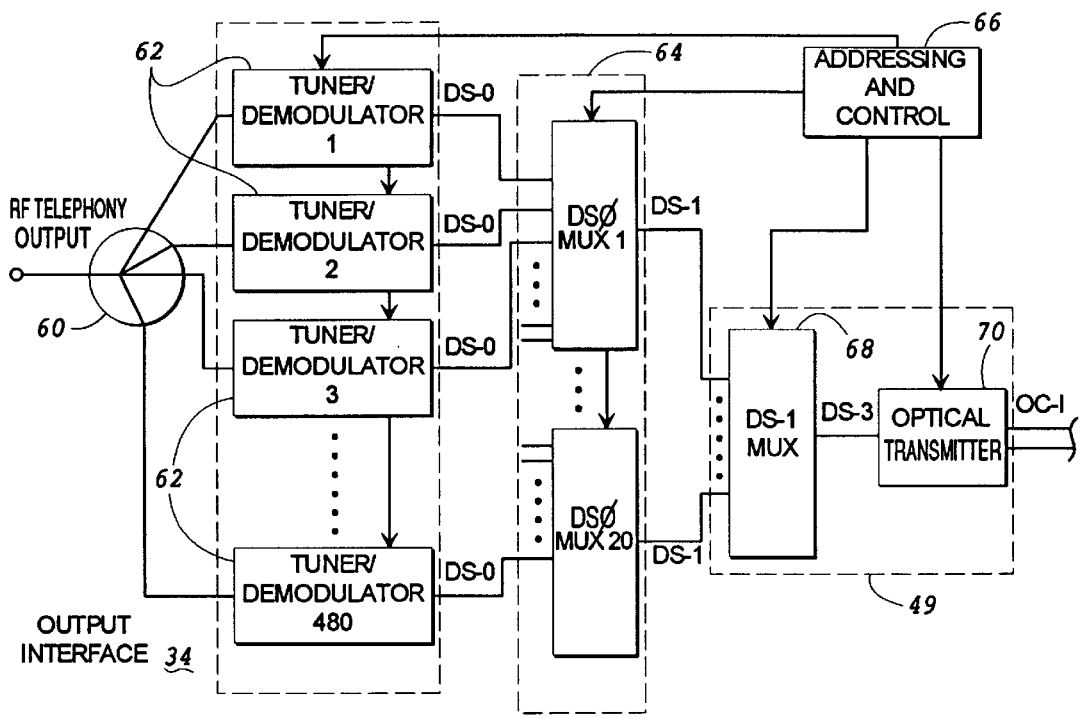
FIG. 5 is a detailed block diagram of the telephony network to the CATV network output interface of the broadband communications system illustrated in FIG. 2.

The output interface 34 will now be more fully described with reference to FIG. 5. The output interface 34 functions to convert the 480 DS0 digital signals which are QPSK modulated on the reverse band carriers into the optical format for coupling to the telephony network 10. The output interface 34 extracts the reverse band signals in a conventional manner and fans them out with a signal divider 60 to a plurality of tuner/demodulators 62. Each of the tuner/demodulators 62 is adapted to tune one of the carrier frequencies of the reverse band signals and demodulate it into a DS0 format digital signal. The tuners of the tuner/demodulators 62 can be variable or fixed, or can be adapted to tune only certain bands of the reverse spectrum. The output of the tuner/demodulators 62 is 480 DS0 signals which are concentrated into groups of DS1 signals by a group of multiplexers 64 under the control of addressing and control unit 66.

Each of the multiplexers 64 inputs 24 DS0 formatted signals and outputs one DS1 formatted signal to a fiber optic transmitter 49. At the fiber optic transmitter 49, the 20 DS1 signals are concentrated by a multiplexor 68 into a single DS3 digital signal which is input to the optical transmitter 70. The addressing and control unit 66 adds the necessary control information in the optical transmitter 70 before communicating the digital DS1 signals in an optical format. The optical transmitter 70 also converts the RF signal into light so the optical fiber of the telephony network can transmit it.

Figure 6:
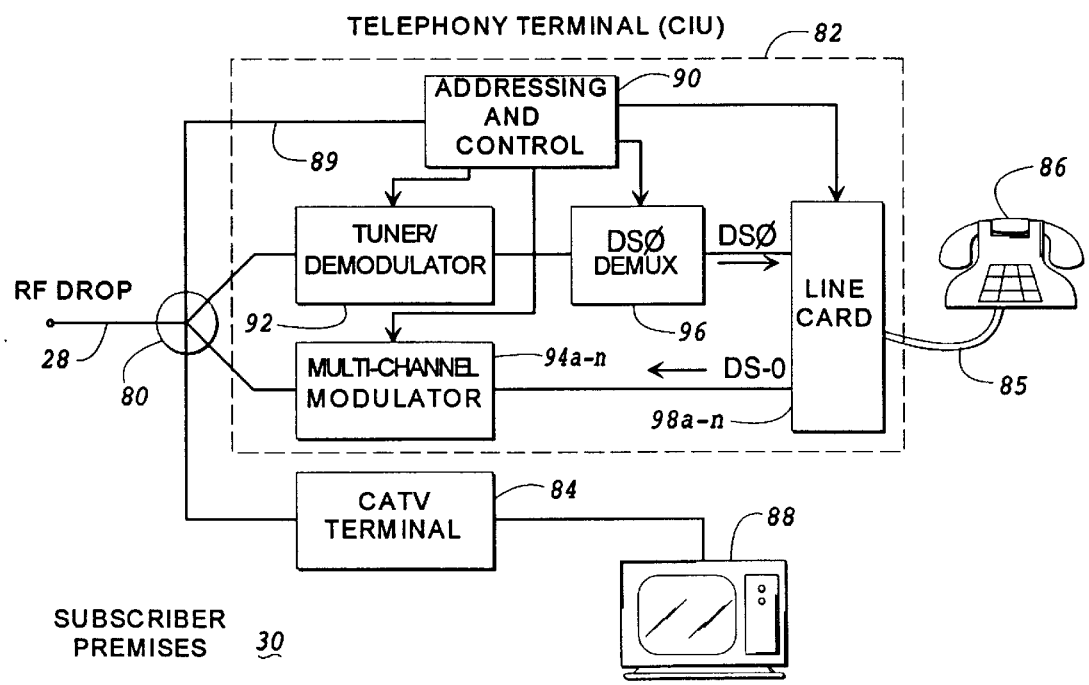
FIG. 6 is a detailed block diagram of a telephony terminal for receiving telephony signals from the telephony network through the CATV network and for transmitting telephony signals to the telephony network through the CATV network.

A detailed block diagram of the system equipment at the subscriber premises 30 is shown in FIG. 6. Generally, the subscriber will want to maintain CATV video or other services and has a CATV terminal 84 for this purpose connected between the CATV drop line 28 and a television receiver 88. The CATV terminal is connected to a splitter/combiner/diplexer 80 coupled to the drop 28 from one of the CATV coaxial subnetwork feeders.

Because the presently described broadband communications system does not interfere with or displace the conventional CATV programming and frequency allocations, the CATV terminal 84 can generally be used with no modification or change in operation of the installed terminal base. The system operator does not need to change or reconfigure its distribution network operation and the new telephone service is compatible with its installed CATV subscriber terminal base.

The broadband communications service is provided by coupling a telephony terminal, also called a "customer interface unit" or "CIU" 82, between the splitter/combiner/diplexer 80 and the telephone equipment 86. The customer interface unit 82 converts the incoming telephony signals to a subscriber into analog signals which can be used by a standard telephone handset 86 over a pair of twisted wires 85. Further, the customer interface unit 82 converts the analog signals, representing outgoing telephony signals from the handset 86, into a QPSK modulation which is coupled to the CATV network. A standard telephone handset 86 is shown for the purpose of illustration but could in fact be any equipment normally connected to a telephone line for digital communications purposes.

The CIU 82 can be adapted for utilization with selectable bandwidth features or services that may be subscribed to by subscriber. Representative services include single line telephony service, multiple line telephony service, ISDN service, data communications service, local or wide area network of data communications such as ETHERNET, or the like.

It will be understood that the CIU 82 can be physically configured either as separate customer premises equipment located in or near a subscriber's telephony punch blocks, or as a CATV set top terminal including one or more RJ-11 or similar telephone connectors. Moreover, because the CIU 82 includes a computer and associated circuitry, can be used for conventional CATV signal management such as pay-per-view control, descrambling, etc. Therefore, the preferred CIU 82, whether implemented as a set-top terminal or as a separate circuitry enclosure, can include a control connection to allow programming signals to be disconnected from a subscriber in the event of non-payment or election not to receive a certain programming.

The CIU 82 has two communication paths. The first path for incoming signals comprising a tuner/demodulator 92, demultiplexor 96, and a portion of line cards 98a–n and a second path for outgoing signals including a portion of the line cards 98a–n and a plurality of modulators 94a–n. The tuner/demodulator 92, modulators 94, demultiplexor 96, and line cards 98 are under the control of an addressing and control unit (CPU) 90.

The incoming communications path transports telephony signals, which are received in 3 MHz channels modulated on an FDM carrier. The control unit 90 causes the tuner/demodulator 92 to tune the carrier on which the particular call information directed to the subscriber is carried. The carrier defines one of the seven 3 MHz channels having 3 DS1 or 3 E-1 telephony signals QPR modulated thereon.

The telephony signals are demodulated by the tuner/demodulator 92 into a serial digital stream containing the 3 DS1 or 3 E-1 telephony signals before being input to the demultiplexor 96. The demultiplexor 96 selects the particular DS0 digital telephony channel assigned to the subscriber at the input rate of 64 kb/s and inputs the data to an input terminal of the line card 98. The control unit 90 determines which forward telephony channel to tune and which DS0 signal to select from that channel based on the signal and addressing information it receives by its connection to the splitter/combiner/diplexer 80 via line 89.

The DS0 digital format provides a voice channel with sufficient bandwidth for voice quality communications. The DS0 format is a 64 kb/s data stream of timed samples of an analog voice signal. This produces a voice signal quantitized to 8-bits per sample (256 values) at a sampling rate of 8 kHz and with a bandwidth of 4 kHz.

Each line card 98 provides a suitable physical connection for customer data in the form of standard output ports or connectors, and provide digital data streams as outputs in response to commands from the address and control unit 90. Further, plural line cards 98 may be provided by a CIU 82 at any given customer premises, depending upon the particular types of services to be provided to the customer.

Alternative line cards 98 of varying types can be used within the CIU 82 depending upon the nature of the service that is to be connected. For example, the line card 98 can be adapted for conventional voice grade telephony line comprising 2-wire twisted pair copper connections with tip (T) and ring (R), as known to those skilled in the art. On the other hand, the line card 98 also can be adapted for ISDN and includes a standard ISDN connector. Other types of lines cards 98 may be provided for connection of other types of customer data service, such as local area network data communications (e.g. ETHERNET), security monitoring systems, video teleconferencing, etc.

The line card 98 receives the digital telephony signal in the DS0 format and converts it to the proper analog voltages and signals to drive the telephone handset 86. In addition, the line card 98 provides ringing current, terminal identification, and other standard functions under the direction of control unit 90. The line card 98 receives the analog telephony signals from the telephone handset 86 and converts them into a digital DS0 format. Dialing signals and other addressing and control signals from the handset 86 are also digitized by the line card 98. The digitized outgoing telephone signals are then combined and formatted by the line card 98 into a DS0 format at 64 kb/s and input via a modulation interface 95 to the modulator 94.

Each line card 98 generally provides a pair of DS0 (64 kbps) data streams, which are combined and formatted by the modulator interface 95, and thereafter transmitted in the reverse path on a carrier by the multi-channel modulator 94. A line card 98 and modulator interface 95 can be assigned to provided to support each of the "independent" channels of the modulator, i.e., for a 6-channel modulator, 6 line cards and 6 modulator interfaces can be allocated to handle the multiple channels of these modulator. However, it will be appreciated that the functions of line cards and modulator interfaces can be consolidated within one or more modules to efficiently package these devices for use with a multi-channel modulator. For purposes of the discussion to follow regarding the multi-channel modulator 94, it is sufficient to understand that this modulator accepts multiple data streams representing in-phase and quadrature signal pairs of telephony information, such as DS0 signals.

The multi-channel modulator 94 is capable of modulating 6 independent carrier signals with the telephony information associated with DS0 signal in a 5.0 MHz bandwidth of a subband of the reverse band. Specifically, the multi-channel modulator 94, under the regulation of the control unit 90, selects a carrier frequency in the reverse band and QPSK modulates the DS0 telephone signal thereon. This QPSK-modulated signal, which has a preferred bandwidth of 49.5 kHz, is coupled on the CATV network through the splitter/combiner/diplexer 80. Any one of the 6 modulated signals output by the modulator 94 can be allocated to any of 101 frequency slots in the 5.0 MHz subband.

Figure 7:
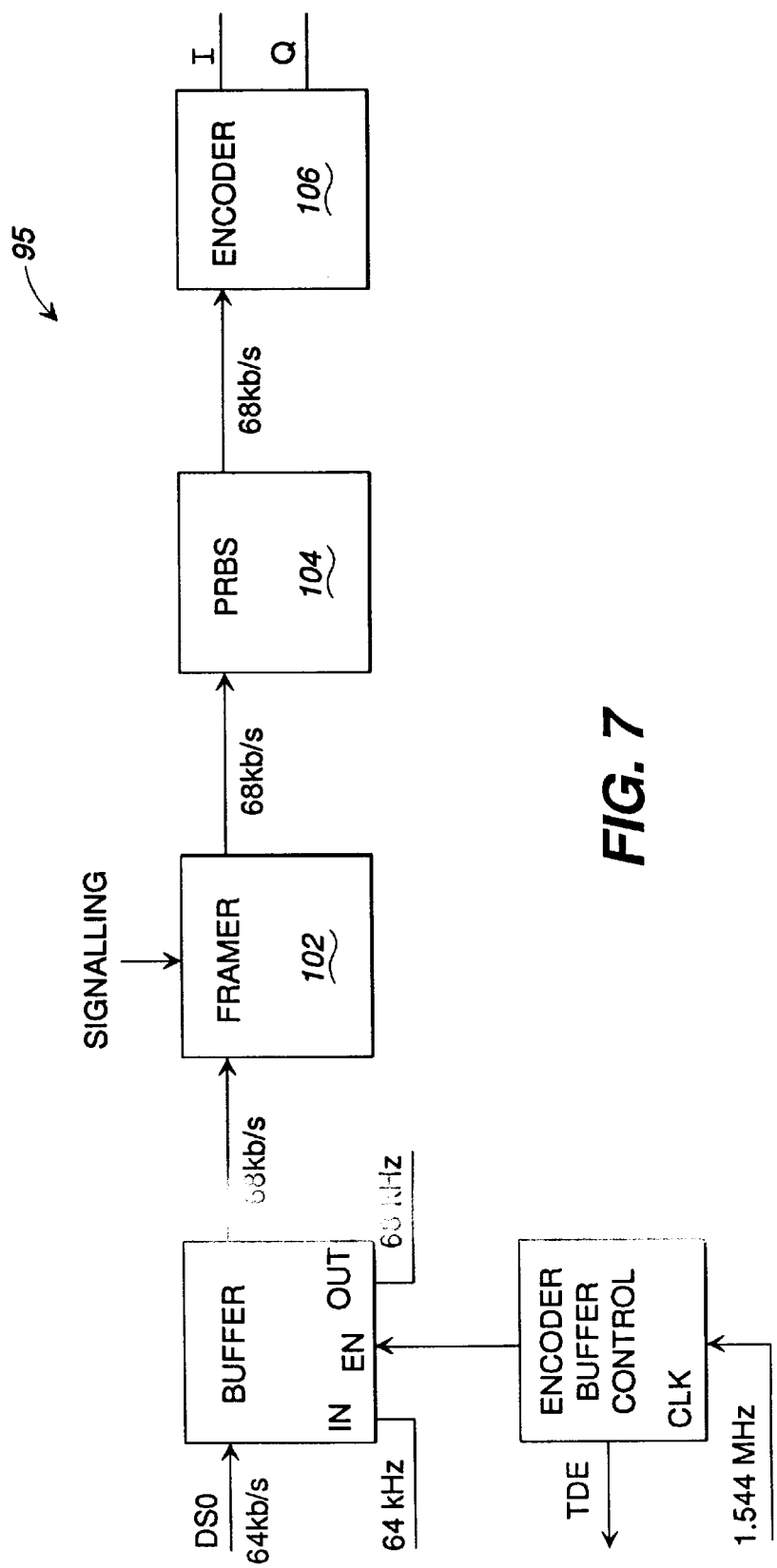
FIG. 7 is a detailed block diagram of a modulator interface for the modulator of the telephony terminal illustrated in FIG. 6.

A schematic diagram of the modulator interface 95 is illustrated in FIG. 7. The modulator interface 95, which can be implemented as a portion of the line card 98, functions to change the data rate from the 64 kbps voice signal at the line card 98 to a slightly increased data rate of 72 kbps, thereby allowing framing bytes to be added to the signal. The modulator interface 95 also combines the data with a pseudo random bit sequence (PRBS), which randomizes the data for eventual transmission over the CATV network. The multi-channel modulator 94 accepts a 72 kbps data stream from the modulator interface 95 and, in turn, QPSK modulates a RF carrier to transmit the information via the coaxial cable subnetwork in a 49.5 kHz channel to the headend. The CIU 82 preferably includes more than one of the modulator interfaces 95 because the multi-channel modulator 94 can accept a plurality of data streams as input signals.

Referring now to FIGS. 6 and 7, the voice data, after being digitally encoded, is shifted into a three stage buffer 100 at 64 kbps and shifted out of the buffer 100 at 72 kbps. This allows an extra byte to be added to the data stream at 26 byte intervals to produce a subframe of 27 bytes. The specialized byte or framing byte is used for frame recognition, error detection and correction, or the like. A DL (data link) byte or SIG/MES (signal/message) byte is used for signaling and the data link in various embodiments, as described in greater detail below.

When the data stream has been increased in frequency, the signal is then framed in a framer 102 which inserts the special framing bytes every 27 data bytes. The framing format is similar to the European E-1 format where bytes are added to a data signal in even and odd frame times.

Then, a randomizer 104 acts on the data to distribute the energy of the signal over longer time periods. It is known that such randomization is beneficial for the clock recovery circuits of the demodulators at the central or headend location. The randomization is accomplished by generating a pseudo random bit string (a "PRBS"), and then adding it byte by byte to the data signal. The longer and more random the string, the more randomizing effect that such operation has on the data. The PRBS can be generated in many ways, but the simplest is with a shift register which continually recirculates the sequence wherein the preferred implementation a 127 bit pattern is used. The output, as is well known, can be derandomized by subtracting the same sequence in the same order which it was added to the bit stream. This digital data is split into in-phase (I) and quadrature (Q) data streams by the encoder 106 and differentially encoded to remove phase ambiguity in the carrier recovery at the receiving end. Each of the I and Q data streams is output by the encoder at a data rate of 36 kbps.

Figure 8:
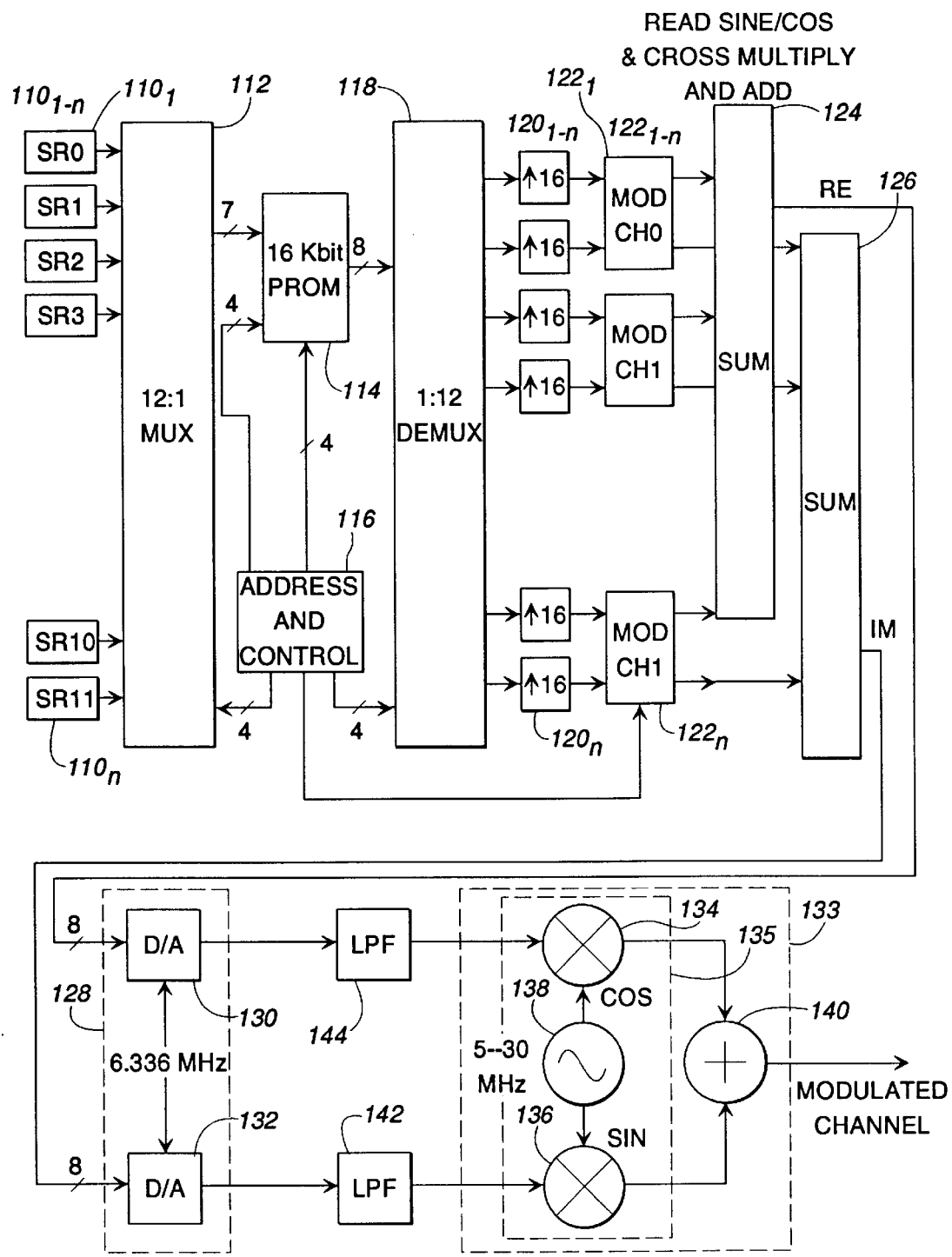
FIG. 8 is a detailed block diagram of the multichannel modulator of the telephony terminal illustrated in FIG. 6.

FIG. 8 shows a block diagram of the preferred implementation for the multi-channel modulator 94. The multi-channel modulator 94 can accept as input signals a plurality of modulating signals containing telephony information to modulate carrier signals having frequencies within the reverse band of the cable network. For the preferred embodiment, the multi-channel modulator 94 can modulate up to 6 separate carrier signals in accordance with the telephony information represented by 6 "independent" DS0 channels within a selected 5.0 MHz subband of the reverse band. Because each of the modulated signals has a bandwidth of approximately 50 kHz (specifically 49.5 kHz), the modulator 94 can place the telephony information of any one of the 6 DS0 channels within any available ones of the approximately 100 frequency slots in a 5.0 MHz bandwidth of the reverse band. This allows each of the modulated signals to be readily placed within the available frequency spectrum of the reverse band.

The solution presented by the multi-channel modulator 94 overcomes a frequency spectrum management problem associated with an alternative technique of modulating "adjacent" carrier signals with the telephony information of DS0 signals, i.e., transmission of telephony information via adjacent channels. Modulated signals or channels are "adjacent" if the channels are placed along side each other within the allocated frequency spectrum. In contrast, a channel is considered to be "independent" if the channel can be placed anywhere within the allocated frequency spectrum without regard to the frequency assignment for other channels. For a subscriber area exhibiting a high concentration of use of the broadband communications system, the likelihood that any single frequency slot will be available for placement of telephony information by the multi-channel modulator 94 is higher than the probability that adjacent frequency slots will be available for use, as required by the alternative adjacent channel technique. In this manner, the multi-channel modulator 94 achieves the desirable goal of flexible frequency spectrum management based on the capability of transmitting modulated signals over independent channels of the reverse band.

Referring now to FIG. 8 for a review of the components of the multi-channel modulator 94, in-phase (I) and quadrature (Q) data streams, each having a data rate of 36 kbps, are input to a Nyquist filter 114 via a series of shift registers $110_{1-n}$ for storage prior to the selection of any one of the I and Q data streams by a multiplexor 112. The I and Q data streams represent modulating signals containing telephony information to be used by the modulator 94 for modulating selected carrier signals to produce the desired modulated signals. For the preferred embodiment (n=12 for shift registers $110_{1-n}$), twelve shift registers and a 12:1 multiplexor are used to support the sequential transfer of six pairs of I and Q data streams to the modulator 94. Each shift register $110^{1-n}$ preferably stores the past 7 bits of either an I data stream or an Q data stream, and a pair of the shift registers is associated with a corresponding pair of I and Q data streams. Each bit of the data stream is associated with a corresponding symbol.

In response to an address signal output by an address generator 116, the multiplexor 112 selects a digital data stream from one of the shift registers $110^{1-n}$ and outputs the selected digital data stream to a Nyquist filter 114. The Nyquist filter 114 accepts each of the 7 bits (or symbols) of a selected I data stream (or Q data stream) and a 4-bit address from the address generator 116 to output a filtered signal having 11 samples per symbol. The address generator 116, which is preferably implemented as a 4-bit counter, clocks the multiplexor 112 and the Nyquist filter 114 to support the output of 11 samples by the Nyquist filter for each input symbol of the selected data stream. In this manner, the data rate for the I and Q signals is effectively increased from 36 kHz to 396 kHz.

The Nyquist filter 114 shapes the frequency spectrum of the selected I signal or Q signal to ensure that the selected signal will fit within the predetermined bandwidth, preferably 396 kHz (8×49.5 kHz), with zero inter symbol interference. Because filtering is conducted for each of the selected I and Q data streams at 396 kHz, 11 samples per symbol (36 kHz×11=396 kHz) are output by the Nyquist filter 114. The preferred design for the Nyquist filter 114 is a square root of Nyquist filter having a roll-off factor of ⅜.

The Nyquist filter 114 is preferably implemented by a 16-kbit erasable programmable memory (EPROM) as a digital filter rather than in the analog domain. It will be appreciated that digital filtering is preferable because the desired total response of the Nyquist filter can be properly achieved by a digital implementation. In addition, it will be appreciated that digital filtering does not suffer from the frequency tuning associated with an analog filter design. Digital signal processing techniques known to those skilled in the art are useful for the design of the Nyquist filter 114.

The output of the Nyquist filter 114 is an 8-bit filtered signal that is supplied to a demultiplexor 118. The bandwidth for the filtered signal is 396 kHz, which is set by the filtering characteristics of the Nyquist filter 114. The demultiplexor 118, which is preferably implemented as a 1:12 demultiplexor, accepts 8-bit filtered signals from the Nyquist filter 114 and 4-bit address signals from the address generator 116. In response, the demultiplexor 118 outputs to a set of interpolation filters $120^{1-n}$ the 8-bit digital data streams representing filtered versions of the I and Q pairs. Each digital data stream output by the demultiplexor 112 has a data rate of 396 kHz.

The preferred embodiment of the multi-channel modulator 94 includes a set of 12 interpolation filters, each pair of filters handling digital data streams representing I and Q data. For example, the first pair of interpolation filters $120^{1-n}$ processes the first pair of I and Q data, the second pair of interpolation filters handles the second pair of I and Q data, and so forth. Each interpolation filters $120^{1-n}$ operates to "upsample" the input digital data stream, which has a bandwidth of 396 kHz, by a factor of 16 to raise the sample rate to 6.33 MHz. In this manner, the interpolation filter 120 provides a one-to-one correspondence between the sampling rate of digital data stream representing I or Q data and the bandwidth of a subband of the reverse band.

Each of the interpolation filters $120^{1-n}$ is preferably implemented by 2 separate stages, a high interpolation filer (HIF) and an upsampling stage. The HIF is a digital filter that upsamples the input digital data stream by a factor of 8 by use of an interpolation technique. The upsampling stage upsamples the digital data stream by a factor of 2 by use of a sample repetition technique. The HIF effectively raises the sampling rate of the input digital data stream to 3.168 MHz, and the sample repetition stage further raises the sampling rate to the desired goal of 6.336 MHz. The architecture for the preferred high interpolation filter is described in more detail below with respect to FIG. 10.

The upsampling operations conducted by the interpolation filters $120^{1-n}$ result in twelve upsampled digital data signals, each pair representing digitally processed versions of the I and Q signals originally presented to the shift registers $120^{1-n}$. At this point, each I and Q pair has been upsampled from an original data rate of 36 kHz to a data rate of 6.336 MHz. The interpolation filters $120a-n$ output the processed I and Q signals to a series of six channel modulators $120^{1-n}$, each modulator accepting a pair of input signals corresponding to a pair of the digitally processed I and Q signals.

The channel modulators $120^{1-n}$ are responsive to the modulating signals represented by the digitally processed versions of the I and Q signal pairs to conduct modulation operations for producing complex modulated signals, as described in more detail below with respect to FIG. 9. Each channel modulator accepts a pair of the processed I and Q signal pairs and produces a complex modulated signal including the telephony information associated with the I and Q signal components. In general, the complex modulation operations include (1) reading sine and cosine values from data stored look-up tables in response to a phase value "PHASE" corresponding to a selected carrier frequency; and (2) completing multiply and add operations to output complex modulated signals including the terms OUTREAL and OUTIMAG, as respectively shown in equations (1) and (2):

$$OUT_{REAL} = I \times Cos\ (PHASE) + Q \times Sin\ (PHASE) \quad (1)$$

$$OUT_{IMAG} = Q \times Cos\ (PHASE) - I \times Sin\ (PHASE) \quad (2)$$

Each of the channel modulators $122^{1-n}$ outputs a real portion of the complex modulated signal, $OUT_{REAL}$, to an adder 124 and a imaginary portion of the complex modulated signal, $OUT_{IMAG}$, to an adder 126.

Although the preferred embodiment of the multi-channel modulator 94 includes six separate channel modulators 122, it will be appreciated that the present invention is not limited to this particular implementation, but can encompass designs having either a smaller or a large quantity of channel modulators.

The adder 124 produces an 8-bit resultant signal by summing each of the "real" output signals generated by the channel modulators $122^{1-n}$. In similar fashion, the adder 126 sums the "imaginary" output signals to generate an 8-bit resultant signal. The adders 124 and 126 output the resultant signals to a digital-to-analog converter (DAC) module 128 formed by the DACs 130 and 132 for conversion of the 8-bit resultant signals to analog signals at a 6.336 MHz rate. The DAC 130 converts the resultant signal output by the adder 124, whereas the DAC 132 converts the resultant signal output by the adder 126. In this manner, the resultant signals, which represent the sum of the "real" portion of the modulated signals and the sum of the "imaginary" portion of the modulated signals, are converted to an analog format. The DACs 130 and 132 output analog versions of the modulated signals via filters 140 and 142 to a transmitter 133. In turn, the transmitter 133 operates to place the modulated signals within the frequency range of the reverse band, specifically 5 to 30 MHz for the preferred broadband communication system. The filters 140 and 142, which are located between the DAC module 128 and the transmitter 133, are preferably implemented as low pass filters defining a 5 MHz bandwidth to eliminate possible aliasing of the frequency spectrum for a 5 MHz suband of the reverse band.

The transmitter 133 includes a frequency shifter 135 and an adder 140. A frequency shifter 135 translates the frequency for each of the converted resultant signals in response to mixing operations conducted by multipliers 134 and 136, which are converted to a variable oscillator 138. The multiplier 134 accepts the converted signal from the DAC 130 and a selected frequency signal (sin) from the variable oscillator 138. In similar fashion, the multiplier 136 accepts the converted resultant signal output by the DAC 132 and a selected frequency signal (cos) from the variable oscillator 138. The variable oscillator 138 can generate a frequency signal representing any frequency selected from a predetermined operating range, such as the bandwidth for the reverse band, i.e., 5–30 MHz. The outputs of the multipliers 134 and 136 are summed by the adder 140, thereby enabling the transmitter 133 to transmit the modulated signal at the desired frequency slot within the reverse band.

Figure 9:
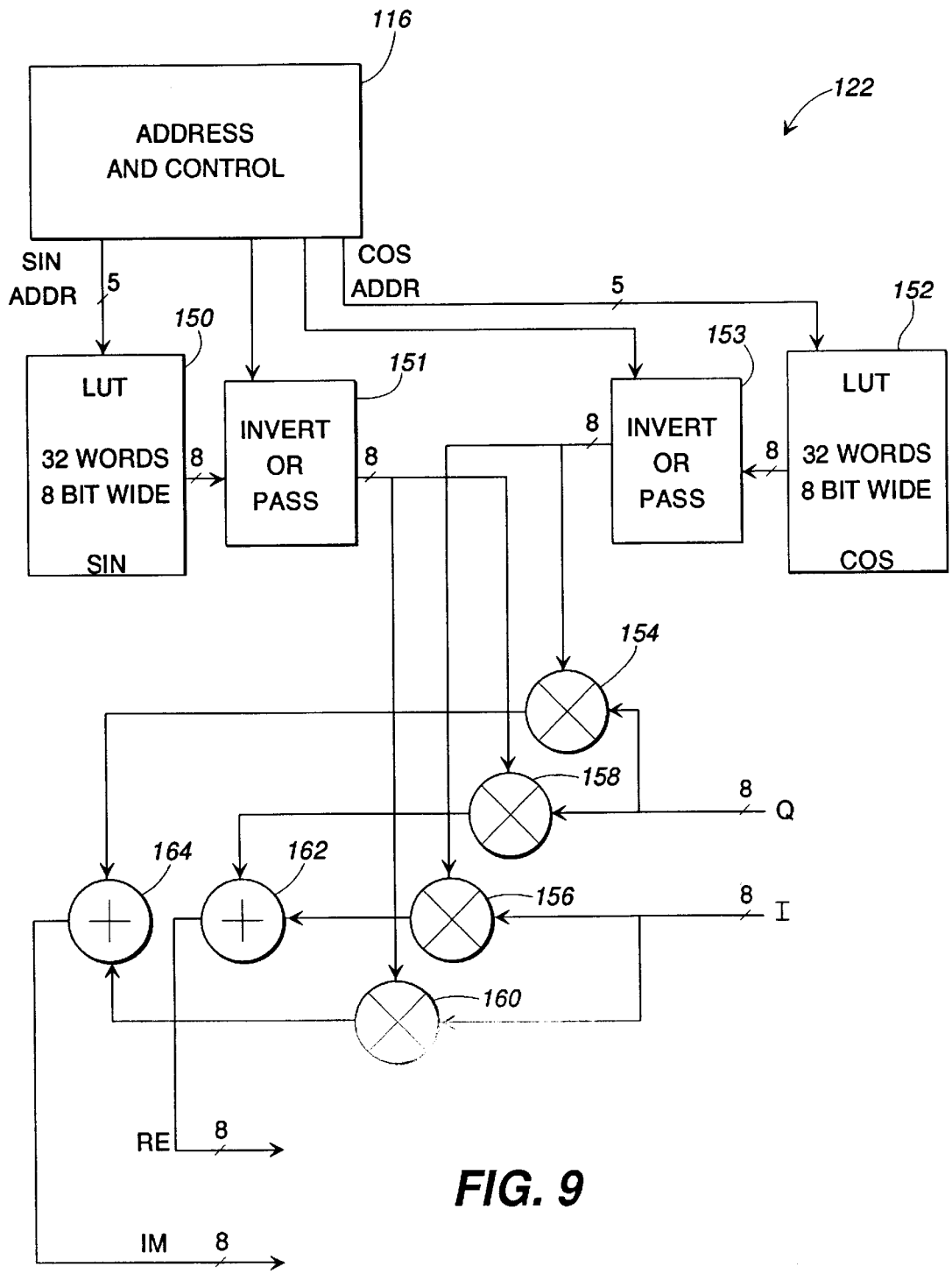
FIG. 9 is a detailed block diagram of a single channel of the modulator shown in FIG. 8.

Turning now to FIG. 9, which illustrates the preferred implementation for each of the channel modulators $122^{1-n}$, a pair of the upsampled versions of the I and Q signals are supplied as input signals or modulating signals to a channel modulator. Each channel modulator 122 preferably comprises a pair of look-up tables 150 and 152, a set of multipliers 154, 156, 158 and 160, and a pair of adders 162 and 164. The look-up tables 150 and 152 respectively include sine and cosine values stored in read-only memory (ROM). The sine and cosine values can be accessed in response to the application of a phase value corresponding to a selected carrier frequency within the 5.0 MHz subband of the reverse band. The preferred look-up tables 150 and 152 are preferably implemented as a single ROM capable of storing 64 words, each 8 bit wide.

In response to a selected 5-bit phase value PHASE, the look-up table 150 outputs a corresponding 8-bit sine value to the multipliers 158 and 160. In similar fashion, the look-up table 152 responds to a selected phase value phase by outputting an 8-bit cosine value to the multipliers 154 and 156. The sine and cosine values in the look-up tables 150 and 152 are accessed by addresses for the stored data, i.e., the sine or cosine values, in response to address signals output by the address generator 116.

In addition, the multipliers 154 and 158 accept the upsampled version of the quadrature or Q signal, and output the respective products "Q×COS (PHASE)" and "Q×SIN (PHASE)". Likewise, the multipliers 156 and 160 accept the upsampled version of the in-phase signal or I signal, and output the respective products "I×COS (PHASE)" and "I×SIN (PHASE)". In this manner, the sine values output by the look-up table 150 are multiplied with the upsampled version of the in-phase signal and the unsampled version of the quadrature signal, and the cosine values output by the look-up table 152 are multiplied by the upsampled version of the quadrature signal and the unsample version of the in-phase signal.

For the preferred embodiment, an invert/pass block 151 is connected between the look-up table 150 and the multipliers 158 and 160. Likewise, another invert/pass block 153 is connected between the look-up table 152 and the multipliers 154 and 156. The invert/pass modules 151 and 153 respond to control signals from the address generator 116 by (1) passing the respective sine and cosine values from the look-up tables for the positive half cycle of the function, and (2) inverting the respective sine and cosine values from the look-up tables for the negative half cycle of the function. This permits an efficient use of available memory space by the look-up tables because only one half of a function, i.e., the positive half, is maintained within memory. Accordingly, the preferred look-up tables 150 and 153 include only half cycle values of the sine and cosine functions to conserve data storage requirements.

It will be understood that an alternative embodiment for a channel modulator 122 can include look-up tables containing the full cycle of values for the sine and cosine functions, thereby eliminating the need for functions supplied by the invert/pass modules 151 and 153.

Referring still to FIGS. 8 and 9, the products output by the multipliers 156 and 158 are supplied to the adder 162. Likewise, the cross-multiplied signals or products output by the multipliers 154 and 160 are supplied to the adder 164. The adder 162 operates to sum the products "Q×SIN (PHASE)" and "I×COS (PHASE)", whereas the adder 164 operates to sum the products "Q×COS (PHASE)" and "I×SIN (PHASE)". The sum generated by the adder 162, "I×COS (PHASE)+Q×SIN (PHASE)", represents the REAL or "RE" value of a complex modulated signal. In contrast, the sum generated by the adder 164, "Q×COS (PHASE)–I×SIN (PHASE)", represents the IMAGINARY or "IM" value of the complex modulated signal.

Referring now to FIGS. 8 and 9, it will be appreciated that the adder 124 produces a sum of REAL components of modulated signals or channels, as shown in equation (3):

REAL Sum: $I\cos w_1 t + Q\sin w_1 t + I\cos w_2 t + Q\sin w_2 t + \ldots + I\cos w_n t + Q\sin w_n t$ (3)

wherein:

$w_1$ = first carrier frequency;

$w_2$ = second carrier frequency; . . .

$w_n = n^{th}$ carrier frequency;

$t$ = time;

$wt$ = PHASE; and $n$ = 6 for 6 channels

In similar fashion, the adder 126 produces a sum of IMAGINARY components of modulated signals or channels, as shown below in equation (4)

IMAGINARY Sum: $Q\cos w_1 t + I\sin w_1 t + Q\cos w_2 t + I\sin w_2 t + \ldots + Q\cos w_n t + I\sin w_n t$ (4)

wherein:

$w_1$ = first carrier frequency;

$w_2$ = second carrier frequency; . . .

$w_n = n^{th}$ carrier frequency;

$t$ = time;

$wt$ = PHASE; and $n$ = 6 for 6 channels

The sums defined by equations (3) and (4), i.e., the REAL sum output by the adder 124 and the IMAGINARY sum output by the adder 126, are then converted to analog signals by the DACs 130 and 132. In turn, the analog form of the REAL and IMAGINARY sums are frequency shifted by a selected frequency by the frequency translator 135 and summed by the adder 140. The sum generated by the adder 140 is represented by equation (5), as shown below:

$\sin w_m t \times [I\cos w_1 t + Q\sin w_1 t + I\cos w_2 t + Q\sin w_2 t + \ldots + I\cos w_n t + Q\sin w_n t] + \cos w_m t \times j[Q\cos w_1 t - I\sin w_1 t + Q\cos w_2 t - I\sin w_2 t + \ldots + Q\cos w_n t - I\sin w_n t]$ wherein: (5)

$w_1$ = first carrier frequency;

$w_2$ = second carrier frequency; . . .

$w_n = n^{th}$ carrier frequency;

$w_m$ = shift frequency $t$ = time;

$wt$ = PHASE; and $n$ = 6 for 6 channels

The sum output by the adder 140 represents the modulated channels placed within the reverse band of the cable network. In particular, the RF signals output from the adder 140 represent QPSK-modulated signals at selected carrier frequencies within a suband having a bandwidth of 5.0 MHz and placed in a reverse band of approximately 5 MHz and 30 MHz.

Figure 10:
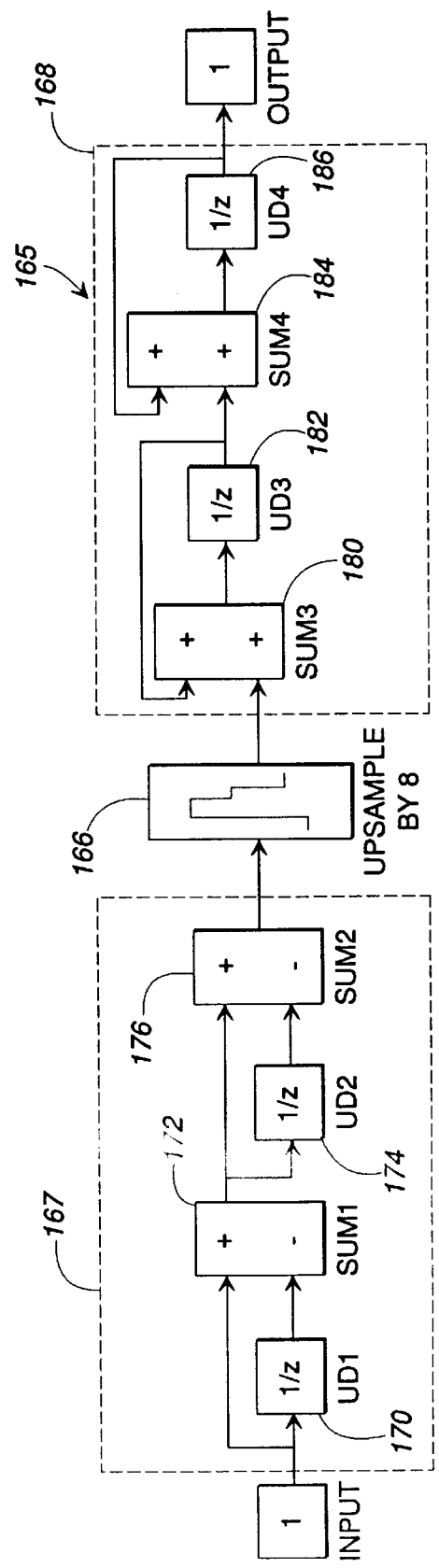
FIG. 10 is a detailed block diagram of a interpolative filter of the modulator shown in FIG. 8.

The functional blocks of the first stage of the interpolation filter 120, a high interpolation filter 165, are shown in FIG. 10. Referring now to FIG. 10, the preferred implementation for the high interpolation filter 165 includes an upsample section 166 connected between a first time delay unit 167 and a second time delay unit 168. The first time delay unit 167 comprises time delays 170 and 174 and adders 172 and 176. Likewise, the second time delay unit 168 comprises time delays 182 and 186 and adders 180 and 184.

Referring now to FIGS. 8 and 10, a filtered signal output by the Nyquist filter 114 is provided as an input to the high interpolation filter 165 via the demultiplexor 118. The filtered signal is directly supplied both to the time delay 170 and to the adder 172. The adder 172 sums the filtered signal with a time delayed version of the filtered signal that is output by the time delay 170. The sum signal representing the sum of the filtered signal and the delayed filtered signal is output to the adder 176 and to the delay 174. The adder 176, which sums the sum signal with a time-delayed version of the sum signal, produces a resultant signal. This resultant signal is then supplied to the upsample section 166.

The upsample section 166 upsamples the resultant signal by a factor of 8, thereby increasing the data rate for this resultant signal. This upsampled signal is then supplied by the upsample section 166 to the second time delay unit 168.

Reviewing now the functional blocks of the second time delay unit 168, the adder 180 accepts as inputs the upsampled signal and a time-delayed version of the sum signal output by the adder 180. A loop between the output of the time delay 182 and one of the inputs for the adder 180 supports the feedback of the delayed version of the sum signal to the adder 180. The delayed version of the sum signal is also output by the time delay 182 to the adder 184.

In response, the adder 184 combines the delayed version of the sum signal with a delayed version of another sum signal output by the adder 184. A feedback loop between the output of the time delay 186 and one of the inputs to the adder 184 supports the feedback of this delayed version of the sum signal output by the adder 184 as an input signal for this component. The delayed version of the sum signal output by the adder 184 is also output as an interpolated signal to the second stage of the interpolation process, i.e., the upsampling section, for repetitive upsampling of the interpolated signal by a factor of 2.

Figure 11:
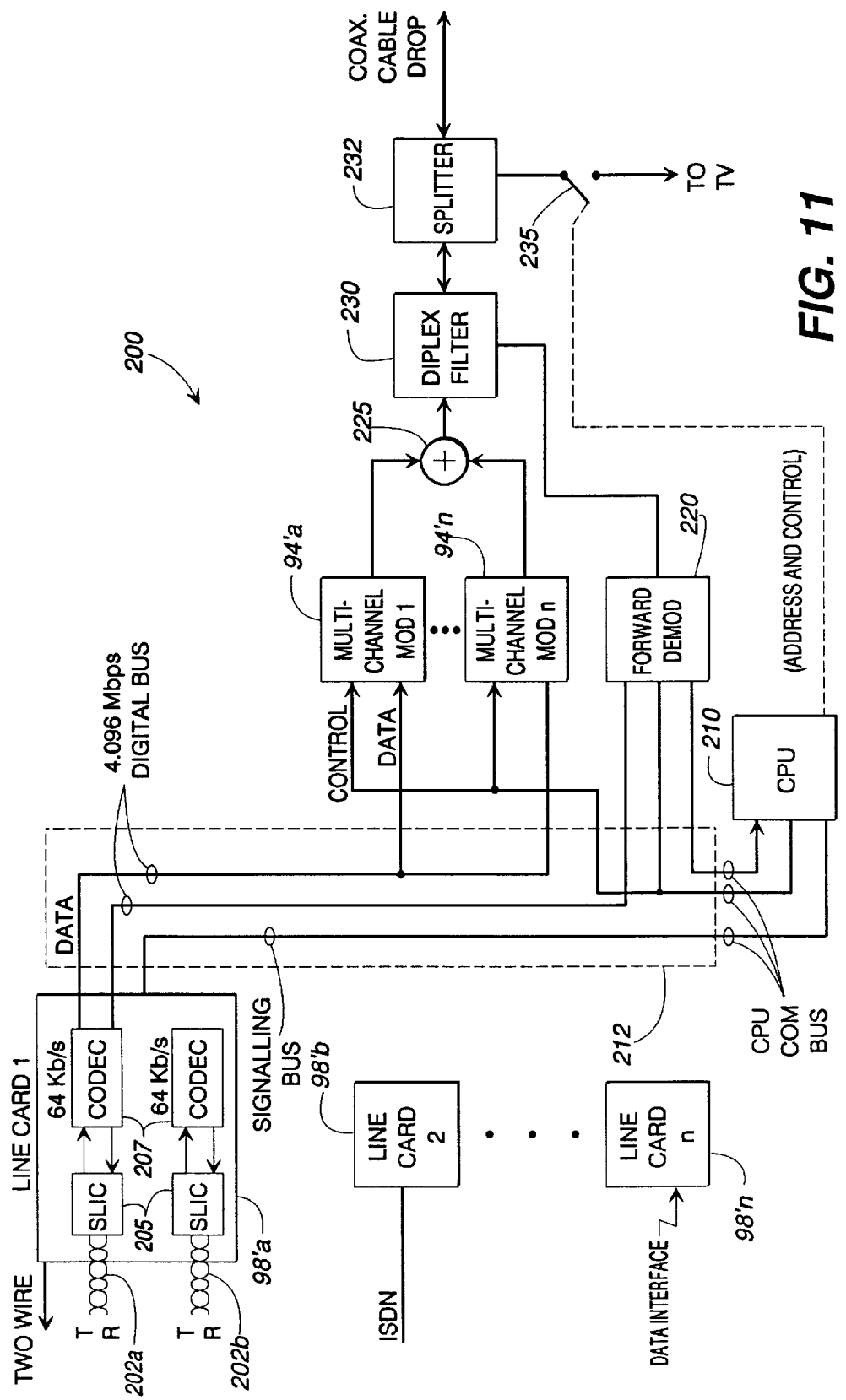
FIG. 11 is a detailed block diagram of an alternative embodiment of a telephony terminal.

FIG. 11 illustrates an alternative embodiment for a customer interface unit, a frequency-agile customer interface unit or CIU 200. The CIU 200 is utilized in the same manner as described in connection above with the telephony terminal 82, and includes the same basic components as described in connection with FIG. 6. However, there are certain differences, as will be described below.

The CIU 200 is especially adapted for utilization with selectable bandwidth features or services that may be subscribed to by subscriber, e.g., single line telephony service, multiple line telephony service, ISDN service, data communications service, local or wide area network of data communications such as ETHERNET, or the like.

In order to implement the on-demand selectable services and to accommodate the varying bandwidths for such services, the CIU 200 includes one or more line cards 98', which are constructed basically the same as the line card 98 shown in FIG. 6. The alternative line cards 98' are of varying types depending upon the nature of the service that is to be connected. For example, the line card in 98'a is adapted for two conventional voice grade telephony line 202a, 202b that comprise the conventional 2-wire twisted pair copper connections with tip (T) and ring (R) known to those skilled in the art. On the other hand, the line card 98'b is adapted for ISDN and includes a standard ISDN connector. Other types of lines cards 98'n may be provided for connection of other types of customer data service such as local area network data communications (e.g. ETHERNET), security monitoring systems, video teleconferencing, etc.

Thus, it will be understood that the line cards 98' include connectors suitable for the particular type of data service to be provided on behalf of the customer. For example, a line card configured for connection to a security alarm network will include a compatible physical connector for connection to the customer's alarm system network and will include circuitry for converting data from the alarm system network into the 64 kbps digital data stream provided for upstream communications.

The standard telephony line card 98'a includes a pair of subscriber line interface circuits (SLIC) 205 that are adapted to receive signals on voice grade telephony lines 202 and couple them to a coder/decoder (CODEC) 207 for digitization. The voice grade telephone lines 202 may be coupled to a subscriber's home wiring network so that a number of subscriber telephones connected in parallel may access a given telephone line.

The preferred SLIC's 205 are type AM7943 or AM7949, manufactured by Advanced Micro Devices in Sunnyvale, Calif.. The CODECs 207 are operative to digitize the voice grade telephone lines into serial 64 kbps digital data. The preferred CODEC's 207 are preferably type AM79C02, manufactured by Advanced Micro Devices.

The output of the codec 207 comprises a digital serial data that is output in response to commands from a control CPU 210 that serves in a capacity corresponding to the address and control unit 90 in the embodiment shown in FIG. 6.

An ISDN-capable line card such as 98'b is substantially the same as the line card 98'a, except that the SLIC circuitry is operative to provide an appropriate ISDN connections, but still provides two 64 kbps digital data streams as outputs. The principal requirement of the line cards 98' are to provide a suitable physical connection for customer data in the form of standard output ports or connectors, and provide digital data streams as outputs in response to commands from the CPU 210. Further, plural line cards may be provided at any given customer premises, depending upon the particular types of services to be provided to the customer.

It will be understood that the nature of the service that is provided at any given CIU 200 must be pre identified and prestored in memory in the headend that is utilized as the telephony network interface, so as to enable provision of the selected service upon demand. In response to a request for service either originating with a subscriber at a selected CIU, or a request for incoming service to a subscriber originating externally to the network, status signals such as the subscriber going off hook, or a ringing condition on an incoming line, the system causes the selection and allocation of appropriate bandwidth, DS0 channels, reverse channels, carriers, etc., required to provide the selectably variable bandwidth commensurate with the selected service.

Still referring to FIG. 11, the line cards 98', whether one or many, are preferably connected to a backplane 212 in the CIU so that signals from the various line cards may be coupled to appropriate modulators and demodulators and receive control signals from the CPU 210. The preferred backplane 212 includes a 4.096 Mbps serial digital bus that is operative to transmit 64 kbps data in a TDMA manner from a selected CODEC 207 in a selected line card to a multi-channel modulator 94'. There is also provided a second 4.096 Mbps digital bus for transmitting data from a forward channel demodulator 220 to selected CODEC 207 in a selected line card for outgoing transmissions. The CPU 210 is operative to control the selection of line cards, reverse channel modulators, and forward channel demodulators. While the preferred embodiment illustrates the use of two 4.096 Mbps digital busses in parallel, it will be understood and appreciated to those skilled in the art that a single 8.192 Mbps digital bus could also be used.

The backplane 212 in the CIU 200 further includes a signaling bus that couples control signals between the line cards 98' and the CPU 210. The signaling bus carries status signal associated with status of the telephony lines such as off hook, on hook, alarm, busy, ring, for inclusion as a part of the status information associate with the selected service.

Outgoing data from the line cards 98' are provided to a set of multi-channel modulators 94' for provision to the broadband network. Each line card generally provides a pair of DS0 (64 kbps) data streams, which are subsequently combined and transmitted in the reverse path on a carrier by a single channel modulator of one of the multi-channel modulators 94'. The multi-channel modulator 94' is utilized in the same manner as described in connection above with the telephony terminal 82, and includes the same basic components as described in connection with FIG. 6 and FIGS. 8 and 9. However, there are certain differences, as will be described below.

The multi-channel modulator 94', constructed in accordance with the alternative embodiment of the present invention, receives serial data input (I and Q signal components) from the digital bus in the form of telephony information (DS0), responds to control signals from the CPU 210 (address and control unit), and responds to the incoming data by modulating a selected RF carrier to place a modulated signal into a selected one of its multiple channels of the reverse band frequency spectrum.

Incoming data from the broadband communications network is derived from at least one forward channel demodulator 220, which is operative to monitor a preassigned channel in the QPR-modulated forward channel utilized for incoming telephony signals. The preferred forward demodulator 220 operates in the manner described above to demodulate a QPR modulated forward channel signal in the designated telephony downstream subband of 15.840 MHz, and to monitor the directory channel and signaling channels provided as a part of the overhead data.

It will be noted that a plurality of multi-channel modulators 94' may be required to provide the appropriate bandwidth required for a given level of service. For example, if a selected service entails the equivalent of four DS0's, then there is the need for four channels of one of the multi-channel modulators 94' or for one or more channels of a plurality of the modulators 94'. Furthermore, it will be recalled that each multi-channel modulator 94' is frequency agile and is not necessarily operating at a given fixed upstream carrier frequency, because upstream channels can be reassigned dynamically and in response to changing conditions such as noise level and reallocation of bandwidth in response to the subscriber's needs. RF carrier frequency selection is completed in accordance with instructions from the CPU 210.

The plurality of multi-channel modulators 94' are connected to a combiner 225 so that the RF output signal can be coupled to the coaxial cable. The output of the combiner 225 is connected to a diplexer filter 230 that passes a signal in the 5–30 MHz range for coupling to a splitter 232 that is connected to the subscriber's coaxial cable drop. The diplexer filter 230 is further operative to pass signals in the selected forward 15.840 MHz spectrum for downstream signals to the forward channel modulator 220 so that the directory channel, signaling channel, and downstream telephony DS0's may be demodulated and coupled to the appropriate line cards.

The splitter 232 is conventional and operates to receive signals from the diplexer filter 230 in the 5–30 MHz reverse band and couple them to the coaxial cable drop; to receive incoming downstream telephony signals in the forward frequency band and couple them to the forward channel demodulator 220; and to pass signals above 30 MHz (in the conventional CATV programming spectrum) to the subscriber's television equipment.

It will be understood that the CIU 200 can be physically configured either as separate customer premises equipment located in or near a subscriber's telephony punch blocks, or as a CATV set top terminal including one or more RJ-11 or similar telephone connectors. Moreover, the CIU, because it includes a computer (CPU 210) and associated circuitry can be used for conventional CATV signal management such as pay-per-view control, descrambling, etc. Therefore, the preferred CIU, whether settop or separate circuitry enclosure, includes a control connection provided from the CPU 210 to a switch 235 associated with the signal line between the splitter 232 and the subscriber's television. This allows the programming signals to be disconnected from a subscriber in the event of non-payment or election not to receive a certain programming.

Finally, each CIU 200 is associated with a unique predetermined serial number for identification purposes in the network. This serial number is preferably maintained internally in a read-only memory. Also, within a particular network configuration, each CIU is assigned a unique 16-bit address by the HIU. The address of the CIU is provided in the upstream channel to the HIU whenever the CIU requests service. The address information is utilized by the HIU to examine a service level table to identify the subscriber associated with the address information and determine the appropriate and authorized level of service to be provided. For example, when a telephone connected to the CIU goes off hook, the address of the CIU is transmitted in association with the off hook status information in the upstream channel to the HIU, where it is received and examined to determine the appropriate service level, DS0 assignments, frequency assignment, etc.

In summary, the broadband communications system provides for broadband communications including digital communications, telephony, and telephony-related services by utilizing a CATV system in an efficient manner, while not requiring extensive switching equipment and a redesign of such systems. The broadband communications system requires no switching in the normal context when connecting telephony based calls from a subscriber or to a subscriber. A multiplicity of calls can be placed through the system efficiently using the broad bandwidth of the CATV network to utilize its best features and having the switching for the connection of the calls performed by the telephony network to utilize its best features.

One of the primary advantages of the broadband communications system is its frequency agility, and the ability to allocate bandwidth to subscribers on demand. The frequency agile feature is preferably provided in the reverse band of the communications system, and is operative for modulating a telephony signal from a subscriber in one or more frequency sub bands in the reverse band of the subscription network so as to provide selectably variable bandwidth in the second band commensurate with selected subscriber communication features. For example, a subscriber can subscribe to a single voice grade line telephone service, plural voice grade telephone line service, ISDN telephone service, local or wide area network communication services (e.g. ETHERNET, Appletalk), security monitoring communication services, or the like.

To support the operations of a customer we interface for the broadband communications system, the present invention provides multi-channel modulator for the transmission of telephony signals within the broadband communication system. A filter accepts digitized data streams of telephony information in the form of I and Q signal components, and filters them to produce filtered I and Q signal components. An interpolation module generates processed I and Q signal components by upsampling filtered I and Q signal components. In turn, these processed I and Q signal components are passed to a set of channel modulators, each channel modulator capable of generating a modulated signal within a discrete increment channel of the reverse band. Each channel modulator accepts a pair of processed I and Q signal components and, in response, modulates a selected carrier signal with one of the telephony signals to produce a complex modulated signal. An adder module responds to the complex modulated signals by summing the real signal components to produce a real resultant signal, and to sum the imaginary components to produce an imaginary resultant signal. A digital-to-analog converter (DAC) module coverts the real resultant signal and the imaginary resultant signal, which are represented by digital data streams, to analog signals. A transmitter, responsive to the analog signals, transmits the modulated signals within a frequency band of the broadband communications network.

While there has been shown and described the preferred embodiment of the invention, it will be evident to those skilled in the art that various modifications and changes may be made thereto without departing from the spirit and scope of the invention as set forth in the appended claims and equivalents thereof.

What is claimed is:

1. An apparatus for generating modulated signals within discrete increment channels in a frequency band by modulating carrier signals in accordance with information signals, each of the information signals including in-phase (I) and quadrature (Q) signal components, comprising:

a filter for filtering the I and Q signal components to generate filtered I and Q signal components;

an interpolation module for generating processed I signal components and processed Q signal components by upsampling the filtered I and Q signal components;

a plurality of channel modulators, each of the channel modulators responsive to a pair of the processed I signal components and processed Q signal components for modulating a selected one of the carrier signals with a selected one of the information signals to produce a complex modulated signal having a real signal component and an imaginary signal component;

an adder module, responsive to the complex modulated signal generated by each of the channel modulators, for summing the real signal component of each channel modulator to produce a real resultant signal and for summing the imaginary signal component of each channel modulator to produce an imaginary resultant signal;

a digital-to-analog converter (DAC) module for converting the real resultant signal and the imaginary resultant signal to analog signals; and a transmitter, responsive to the analog signals, for transmitting the modulated signals within the discrete increment channels of the frequency band.

2. The apparatus of claim 1 further comprising a control module for controlling access by the I and Q signal components to the filter by queuing and serially inputting each of the I and Q signal components.

3. The apparatus of claim 2, wherein the control module comprises:

a plurality of shift registers, one for each of the I and Q signal components, for storing the I and Q signal components; and a multiplexor, connected to the plurality of shift registers, for supplying a selected one of the I and Q signal components to the filter in response to an address signal corresponding to the selected one of the I and Q signal components.

4. The apparatus of claim 3 further comprising a demultiplexor, connected between the filter and the channel modulators, for supplying the filtered I and Q signal components to the channel modulators.

5. In a bidirectional communications system comprising a plurality of customer interface unite (CIU), each defining a destination for incoming data and an origin for outgoing data and including a multi-channel modulator for generating modulated signals within discrete increment channels of a frequency band of the bidirectional communications system by modulating assigned carriers for a plurality of upstream channels with a outgoing data, the multi-channel modulator comprising;

filter, responsive to in-phase (I) signal components and quadrature (Q) signal components of the outgoing data, for filtering the I signal components and the Q signal components to generate filtered I and Q signal components;

a plurality of channel modulators, each of the channel modulators responsive to the filtered I and Q signal components for modulating a selected one of the assigned carriers for the plurality of upstream channels with the outgoing data to produce a complex modulated signal having a real signal component and an imaginary signal component;

an adder module, responsive to the complex modulated signal generated by each of the channel modulators, for summing the real signal component of each channel modulator to produce a real resultant signal and for summing the imaginary signal component of each channel modulator to produce an imaginary resultant signal;

a digital-to-analog converter (DAC) module for converting the real resultant signal and the imaginary resultant signal to analog signals; and a transmitter, responsive to the analog signals, for transmitting the modulated signals within the discrete increment channels.

6. The multi-channel modulator of claim 5 further comprising an interpolation module, connected between the filter and the channel modulators, for increasing the data rate of the filtered I and Q signals by upsampling the filtered I and Q signal components.

7. The apparatus of claim 5 further comprising a control module for controlling access by the I signal components and the Q signal components to the filter by queuing and serially inputting each of the I signal components and the Q signal components.

8. The apparatus of claim 7, wherein the control module comprises:

a plurality of shift registers, one for each of the I signal components and the Q signal components, for storing the I signal components and the Q signal components; and a multiplexor, connected to the plurality of shift registers, for supplying a selected one of the I signal components and the Q signal components to the filter in response to an address signal corresponding to the selected one of the I signal components and the Q signal components.

9. The apparatus of claim 8 further comprising a demultiplexor, connected between the filter and the channel modulators, for supplying the filtered I and Q signal components to the channel modulators.

10. The apparatus of claim 9, wherein the multi-channel modulator further comprises an interpolation module, connected between the demultiplexor and the channel modulators, for increasing the data rate of the filtered I and Q signals by upsampling the filtered I and Q signal components.

11. The apparatus of claim 5, wherein the adder module comprises a first adder and a second adder, the first adder responsive to the complex modulated signal generated by each of the channel modulators for summing the real signal component of each channel modulator to produce a real resultant signal, and the second adder responsive to the complex modulated signal generated by each of the channel modulators, for summing the imaginary component of each channel modulator to produce an imaginary resultant signal.

12. The apparatus of claim 5, wherein the digital-to-analog converter (DAC) module comprises a first DAC for converting the real resultant signal to a first one of the analog signals and a second DAC for converting the imaginary resultant signal to a second one of the analog signals.

13. The apparatus of claim 5, wherein the transmitter comprises:

a frequency shifter, responsive to the analog signals and to a frequency shift signal having a selected frequency for one of the discrete increment channels of the frequency band, for shifting the first analog signal by the selected frequency and for shifting the second analog signal by the selected frequency; and an adder for summing the first and second analog signals to generate the modulated signals within the discrete increment channels of the frequency band.

14. The apparatus of claim 5, wherein each of the channel modulators is a quadrature phase shift keying (QPSK)

modulator operative at one of the assigned carriers varying in the discrete increment channels of 49.5 kHz, each of the assigned carriers positioned within one of 101 channels of a 5.0 MHz subband of the frequency band of the bidirectional communications system, with a nominal data rate of 144 kbps per channel.

15. A customer interface unit (CIU) for connection to a broadband communication network, the CIU operative for receiving first signals in a first frequency band from a headend associated with the broadband communication network and for communicating telephony signals between a subscriber and the headend in a second frequency band of the broadband communication network, the customer interface unit comprising:

a first demodulator for demodulating the first signals in the first frequency band to produce demodulated first signals and for coupling the demodulated first signals to an output port of the customer interface unit; and a multi-channel modulator for generating modulated signals in the second frequency band by modulating carrier signals in accordance with the telephony signals, each of the telephony signals including in-phase (I) and quadrature (Q) signal components, the multi-channel modulator comprising:

a filter for filtering the I and Q signal components to produce filtered I and Q signal components;

an interpolation module for generating processed I and Q signal components by upsampling the filtered I and Q signal components;

a plurality of channel modulators, each of the channel modulators responsive to the processed I and Q signal components for modulating a selected one of the carrier signals with a selected one of the telephony signals to produce a complex modulated signal having a real signal component and an imaginary signal component;

an adder module, responsive to the complex modulated signal generated by each of the channel modulators, for summing the real signal component of each channel modulator to produce a real resultant signal and for summing the imaginary signal component of each channel modulator to produce an imaginary resultant signal;

a digital-to-analog converter (DAC) module for converting the real resultant signal and the imaginary resultant signal to analog signals; and a transmitter, responsive to the analog signals, for transmitting the modulated signals within the second frequency band of the broadband communications network.

16. The apparatus of claim 15 further comprising a control module for controlling access by the I and Q signal components to the filter by queuing and serially inputting each of the I and Q signal components.

17. The apparatus of claim 16, wherein the control module comprises:

a plurality of shift registers, one for each of the I signal components and the Q signal components, for storing the I signal components and the Q signal components; and a multiplexor, connected to the plurality of shift registers, for supplying a selected one of the I signal components and the Q signal components to the filter in response to an address signal corresponding to the selected one of the I signal components and the Q signal components.

18. The apparatus of claim 17, wherein the multi-channel modulator further comprises a demultiplexor, connected between the filter and the channel modulators, for supplying the filtered I and Q signal components to the channel modulators.

19. The apparatus of claim 18, wherein the multi-channel modulator further comprises an interpolation module, connected between the demultiplexor and the channel modulators, for increasing the data rate of the filtered I and Q signal components by upsampling the filtered I and Q signal components.

20. The apparatus of claim 15, wherein the adder module comprises a first adder and a second adder, the first adder responsive to the complex modulated signal generated by each of the channel modulators for summing each real signal component to produce a real resultant signal, and the second adder responsive to the complex modulated signal generated by each of the channel modulators, for summing each imaginary component to produce an imaginary resultant signal.

21. The apparatus of claim 15, wherein the digital-to-analog converter (DAC) module comprises a first DAC for converting the real resultant signal to a first one of the analog signals and a second DAC for converting the imaginary resultant signal to a second one of the analog signals.

22. The apparatus of claim 21, wherein the transmitter comprises:

a frequency shifter, responsive to the analog signals and to a frequency shift signal having a selected frequency of the second frequency band, for shifting the first analog signal by the selected frequency and for shifting the second analog signal by the selected frequency; and an adder for summing the first and second analog signals to generate the modulated signals of the second frequency band.

23. A customer interface unit (CIU) for connection to a broadband communication network, the CIU operative for receiving first signals in a first frequency band from a headend associated with the broadband communication network, for receiving second signals from the headend, and for communicating telephony signals between a subscriber and the headend, said customer interface unit comprising:

a first demodulator for demodulating the first signals in the first frequency band and for coupling them to an output port of the customer interface unit;

a second demodulator for receiving the second signals and for identifying, from the second signals, one of a plurality of frequency sub bands in a second frequency band in the broadband communication network for communicating the telephony signals to the headend; and a frequency agile modulator, responsive to the identified one of said plurality of frequency sub bands in the second frequency band, for generating modulated signals by modulating the telephony signals from the customer interface unit in the identified frequency subband, each of the telephony signals including in-phase (I) and quadrature (Q) signal components, the frequency agile modulator comprising:

a filter for filtering the I and Q signal components to produce filtered I and Q signal components;

an interpolation module for generating processed I and Q signal components by upsampling the filtered I and Q signal components;

a plurality of channel modulators, each of the channel modulators responsive to a pair of the processed I and Q signal components for modulating one of a plurality of carrier signals selected in response to the identified one of the plurality of frequency subbands in the second frequency band with a selected one of the telephony signals to produce a complex modulated signal having a real signal component and an imaginary signal component;

an adder module, responsive to the complex modulated signal generated by each of the channel modulators, for summing the real signal component of each channel modulator to produce a real resultant signal and for summing the imaginary signal component of each channel modulator to produce an imaginary resultant signal;

a digital-to-analog converter (DAC) module for converting the real resultant signal and the imaginary resultant signal to analog signals, and a transmitter, responsive to the analog signals, for transmitting the modulated signals within the identified frequency subband of the second frequency band of the broadband communications network.

24. The customer interface unit of claim 23, wherein said first signals comprise television program signals, and wherein said output port comprises a video signal port for connection to a CATV set top converter.

25. The customer interface unit of claim 23, wherein said output port comprises a telephony port for receiving the telephony signals into the customer interface unit.

26. The customer interface unit of claim 23, wherein the second signals are communicated in the first frequency band and comprise a message including address information corresponding to a selected subscriber and frequency subband information corresponding to a one of the frequency sub bands in the second frequency band in the broadband communications network.

27. The customer interface unit of claim 23, wherein said frequency agile modulator is operative to change the frequency at which the telephony signals are being communicated to the headend from a first frequency subband of the second frequency band in the broadband communications network to a second frequency subband of the second frequency band in the broadband communications network in response to a command received as one of the second signals.

28. The apparatus of claim 1, wherein each of the channel modulators comprises:

first and second look-up tables, the first look-up table storing cosine function values and the second-look-up table storing sine function values the cosine function values and the sine function values being accessed in response to a phase value corresponding to the selected carrier signal;

a plurality of multipliers, responsive to the cosine function value and the sine function values and to the processed I and Q signal components, to produce cross products; and a plurality of adders, responsive to the cross products, to produce the real signal component of the complex modulated signal and the imaginary signal component of the complex modulated signal.

29. The apparatus of claim 28, wherein each channel modulator further comprises:

a first invert/pass block, connected between the first look-up table and the multipliers for passing the cosine function values from the first look-up table for the positive half cycle of the cosine function, and inverting the cosine function values from the first look-up table for the negative half cycle of the cosine function;

a second invert/pass module, connected between the second look-up table and the multipliers, for passing the sine function values from the second look-up table for the positive half cycle of the sine function, and inverting the sine function values from the second look-up table for the negative half cycle of the sine function;

wherein the first look-up table stores the positive half cycle of the cosine function and the second lock-up table stores the positive half cycle of the sine function.

30. The apparatus of claim 1, wherein each of the channel modulators comprises:

first and second look-up tables, the first look-up table storing a plurality of cosine function values and the second-look-up table storing a plurality of sine function values, the cosine function values and the sine function values being accessed in response to a phase value corresponding to the selected carrier signal;

a first multiplier responsive to the cosine function values and the processed Q signal components to produce a first product;

a second multiplier responsive to the sine function values and the processed Q signal components to produce a second product;

a third multiplier responsive to the cosine function values and the processed I signal components to produce a third product;

a fourth multiplier responsive to the sine function values and the processed I signal components to produce a fourth product;

a first adder, responsive to the second product and the third product to produce the real signal component of the complex modulated signal; and a second adder responsive to the first product and the fourth products to produce the imaginary signal component of the complex modulated signal.

31. The apparatus of claim 30, wherein each channel modulator further comprises:

a first invert/pass block, connected between the first look-up table and the first and third multipliers, for passing the cosine function values from the first look-up table for the positive half cycle of the cosine function, and inverting the cosine function values from the first look-up table for the negative half cycle of the cosine function;

a second invert/pass module, connected between the second look-up table and the second and fourth multipliers, for passing the sine function values from the second look-up table for the positive half cycle of the sine function, and inverting the sine function values from the second look-up table for the negative half cycle of the sine function;

wherein the first look-up table stores the positive half cycle of the cosine function and the second look-up table stores the positive half cycle of the sine function.

32. The apparatus of claim 5, wherein each of the channel modulators comprises;

first and second look-up tables, the first look-up table storing a plurality of cosine function values and the second-look-up table storing a plurality of sine function values, the cosine function value and the sine function values being accessed in response to a phase value corresponding to the selected assigned carrier;

a plurality of multipliers, responsive to the cosine function values and the sine function values and to the filtered I and Q signal components, to produce cross products; and a plurality of adders, responsive to the cross products, to produce the real signal component of the complex modulated signal and the imaginary signal component of the complex modulated signal.

33. The apparatus of claim 32, wherein each channel modulator further comprises:

a first invert/pass block, connected between the first look-up table and the multipliers, for passing the cosine function values from the first look-up table for the positive half cycle of the cosine function, and inverting the cosine function values from the first look-up table for the negative half cycle of the cosine function;

a second invert/pass module, connected between the second look-up table and the multipliers, for passing the sine function values from the second look-up table for the positive half cycle of the sine function, and inverting the sine function values from the second look-up table for the negative half cycle of the sine function;

wherein the first look-up table stores the positive half cycle of the cosine function and the second look-up table stores the positive half cycle of the sine function.

34. The apparatus of claim 5, wherein each of the channel modulators comprises:

first and second look-up tables, the first look-up table storing a plurality of cosine function values and the second-look-up table storing a plurality of sine function values, the cosine function values and the sine function values being accessed in response to a phase value corresponding to the selected carrier;

a first multiplier responsive to the cosine function values and the filtered Q signal components to produce a first product;

a second multiplier responsive to the sine function values and the filtered Q signal components to produce a second product;

a third multiplier responsive to the cosine function values and the filtered I signal components to produce a third product;

a fourth multiplier responsive to the sine function values and the filtered I signal components to produce a fourth product;

a first adder, responsive to the second product and the third product to produce the real signal component of the complex modulated signal; and a second adder responsive to the first product and the fourth product to produce the imaginary signal component of the complex modulated signal.

35. The apparatus of claim 34, wherein each channel modulator further comprises:

a first invert/pass block, connected between the first look-up table and the first and third multipliers, for passing the cosine function values from the first look-up table for the positive half cycle of the cosine function, and inverting the cosine function values from the first look-up table for the negative half cycle of the cosine function;

a second invert/pass module, connected between the second look-up table and the second and fourth multipliers, for passing the sine function values from the second look-up table for the positive half cycle of the sine function, and inverting the sine function values from the second look-up table for the negative half cycle of the sine function;

wherein the first look-up table stores the positive half cycle of the cosine function and the second look-up table stores the positive half cycle of the sine function.

36. The apparatus of claim 15, wherein each of the channel modulators comprises:

first and second look-up tables, the first look-up table storing a plurality of cosine function values and the second-look-up table storing a plurality of sine function values, the cosine function values and the sine function values being accessed in response to a phase value corresponding to the selected carrier signal;

a plurality of multipliers, responsive to the cosine function values and the sine function values and to the processed I and Q signal components, to produce cross products; and a plurality of adders, responsive to the cross products, to produce the real signal component of the complex modulated signal and the imaginary signal component of the complex modulated signal.

37. The apparatus of claim 36, wherein each channel modulator further comprises:

a first invert/pass block, connected between the first look-up table and the multipliers, for passing the cosine function values from the first look-up table for the positive half cycle of the cosine function, and inverting the cosine function values from the first look-up table for the negative half cycle of the cosine function;

a second invert/pass module, connected between the second look-up table and the multipliers, for passing the sine function values from the second look-up table for the positive half cycle of the sine function, and inverting the sine function values from the second look-up table for the negative half cycle of the sine function;

wherein the first look-up table stores the positive half cycle of the cosine function and the second look-up table stores the positive half cycle of the sine function.

38. The apparatus of claim 15, wherein each of the channel modulators comprises;

first and second look-up tables, the first look-up table a plurality of storing cosine function values and the second-look-up table storing a plurality of sine function values, the cosine function values and the sine function values being accessed in response to a phase value corresponding to the selected carrier signal;

a first multiplier responsive to the cosine function values and the processed Q signal components to produce a first product;

a second multiplier responsive to the sine function values and the processed Q signal components to produce a second product;

a third multiplier responsive to the cosine function values and the processed I signal components to produce a third product;

a fourth multiplier responsive to the sine function values and the processed I signal components to produce a fourth product;

a first adder, responsive to the second product and the third product to produce the real signal component of the complex modulated signal; and a second adder responsive to the first product and the fourth product to produce the imaginary signal component of the complex modulated signal.

39. The apparatus of claim 38, wherein each channel modulator further comprises:

a first invert/pass module, connected between the first look-up table and the first and third multipliers, for passing the cosine values from the first look-up table for the positive half cycle of the cosine function, and inverting the cosine values from the first look-up table for the negative half cycle of the cosine function;

a second invert/pass module, connected between the second look-up table and the second and fourth multipliers, for passing the sine function values from the second look-up table for the positive half cycle of the sine function, and inverting the sine function values from the second look-up table for the negative half cycle of the sine function;

wherein the first look-up table stores the positive half cycle of the cosine function and the second look-up table stores the positive half cycle of the sine function.

\* \* \* \* \*